(12) United States Patent
Chen et al.

(10) Patent No.: US 12,464,114 B2
(45) Date of Patent: Nov. 4, 2025

(54) GEOMETRIC PARTITION MODE IN VIDEO CODING

(71) Applicant: QUALCOMM Incorporated, San Diego, CA (US)

(72) Inventors: Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 204 days.

(21) Appl. No.: 18/068,767

(22) Filed: Dec. 20, 2022

(65) Prior Publication Data

US 2023/0231992 A1 Jul. 20, 2023

Related U.S. Application Data

(60) Provisional application No. 63/266,386, filed on Jan. 4, 2022.

(51) Int. Cl.
*H04N 19/105* (2014.01)
*H04N 19/132* (2014.01)
*H04N 19/176* (2014.01)

(52) U.S. Cl.
CPC ......... *H04N 19/105* (2014.11); *H04N 19/132* (2014.11); *H04N 19/176* (2014.11)

(58) Field of Classification Search
None
See application file for complete search history.

(56) References Cited

U.S. PATENT DOCUMENTS

2021/0051335 A1* 2/2021 Liao ..................... H04N 19/503
2021/0258575 A1 8/2021 Zhang et al.
(Continued)

FOREIGN PATENT DOCUMENTS

WO 2021253373 A1 12/2021

OTHER PUBLICATIONS

Bross B., et al., "Versatile Video Coding Editorial Refinements on Draft 10", JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515, XP030293334.
(Continued)

*Primary Examiner* — Chikaodili E Anyikire
(74) *Attorney, Agent, or Firm* — Shumaker & Sieffert, P.A.

(57) ABSTRACT

A method of encoding or decoding video data includes determining that geometric partition mode is enabled for a current block of the video data, the geometric partition mode comprising a plurality of split modes that each defines an edge for partitioning; for each split mode among at least two of the plurality of split modes, determining a respective cost associated with a respective split mode; constructing, based on the respective costs associated with the respective split modes, a mapping list including index values respectively associated with values indicative of the respective split modes, where a lower index value is associated with a first split mode having a lower cost than a second split mode with a higher index value; determining a split mode amongst the plurality of split modes within the mapping list; and reconstructing a current block of the video data based on the split mode.

48 Claims, 15 Drawing Sheets

(56) References Cited

U.S. PATENT DOCUMENTS

| | | | |
|---|---|---|---|
| 2021/0337215 A1 | 10/2021 | Zhang et al. | |
| 2022/0053206 A1 | 2/2022 | Ko et al. | |
| 2022/0150488 A1 | 5/2022 | Lim et al. | |
| 2022/0295089 A1 | 9/2022 | Zhang et al. | |
| 2023/0042640 A1* | 2/2023 | Ma | H04N 19/159 |
| 2024/0214606 A1* | 6/2024 | Deng | H04N 19/184 |
| 2024/0244239 A1* | 7/2024 | Li | H04N 19/176 |

OTHER PUBLICATIONS

Chang Y-J., et al., "Compression Efficiency Methods Beyond VVC", 21. JVET Meeting, Jan. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, pp. 1-13, XP030293237.

Chen C-C., et al., "EE2-2.4: Template Matching Based Reordering for GPM Split Modes", JVET-Z0056-v3, Joint Video Experts Team (JVET) of ITU-T SG 16 WP 3 and ISO/IEC JTC 1/SC 29, 26th Meeting, by teleconference, Apr. 20-29, 2022, pp. 1-3.

Chen C-C., et al., "Non-EE2: Template matching based reordering for GPM split modes", JVET-Y0135-v2, Joint Video Experts Team (JVET) of ITU-T SG 16 WP 3 and ISO/IEC JTC 1/SC 29, 25th Meeting, by teleconference, Jan. 12-21, 2022, pp. 1-3.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 4 (VTM 4)", 13th JVET Meeting, Jan. 9, 2019-Jan. 18, 2019, Marrakech, (The Joint Video Exploration Team of ISO/IEC JTC1/SC29/WG11 and ITU-T SG.16 WP3), No. JVET-M1002-v2, Mar. 19, 2019 (Mar. 19, 2019), XP030255391, pp. 1-62.

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Coban M., et al., "Algorithm Description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

Co-pending U.S. Appl. No. 18/057,500, inventor Chen; Chun-Chi, filed Nov. 21, 2022.

International Search Report and Written Opinion—PCT/US2022/053607—ISA/EPO—Mar. 15, 2023 (13 pp).

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "Exploration Experiment on Enhanced Compression beyond VVC capability (EE2)", JVET-Y2024-2, Joint Video Experts Team (JVET) of ITU-T SG 16 WP 3 and ISO/IEC JTC 1/SC 29, 25th Meeting, by teleconference, Jan. 12-21, 2022, pp. 1-15.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

* cited by examiner

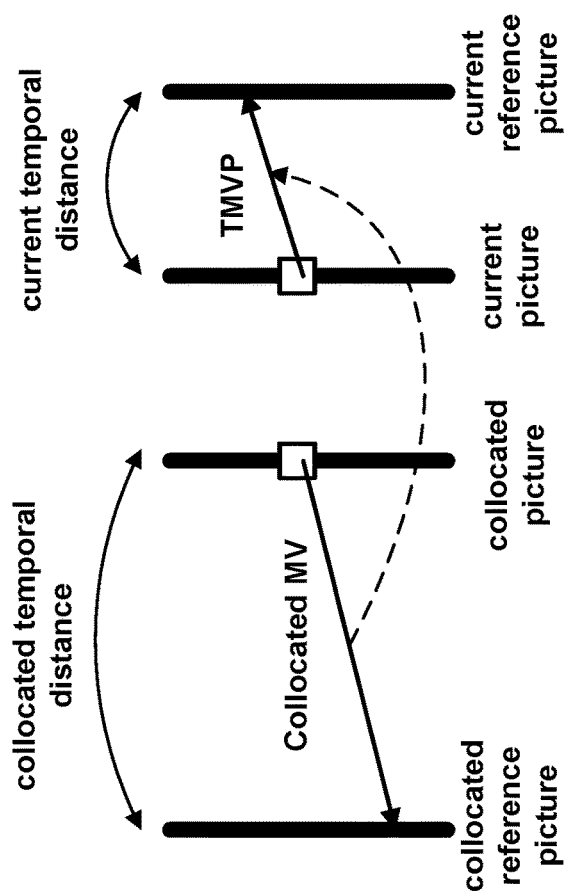
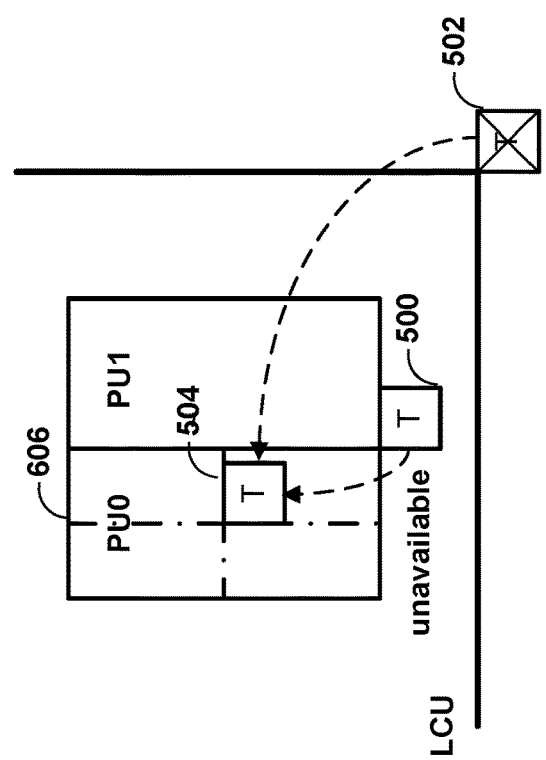
FIG. 5B
FIG. 5A

GEOMETRIC PARTITION MODE IN VIDEO CODING

This application claims the benefit of U.S. Provisional Application No. 63/266,386, filed Jan. 4, 2022, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling and parsing the syntax (e.g., split mode, candidate index, MVD (motion vector difference) offsets) that is used to identify the parameters of geometric partition modes (e.g., geometric partition mode (GEO), GEO+MMVD (merge motion vector difference, GEO+TM (template matching) modes). The geometric partition modes may also be referred to as geometric partitioning mode (GPM), GPM+MMVD, or GPM+TM. The example techniques of this disclosure may optimize the syntax that is used to signal the parameters of geometric partition modes. The example techniques may be applied to any of the existing video codecs, such as HEVC (High Efficiency Video Coding), VVC (Versatile Video Coding), or Essential Video Coding (EVC), or be an efficient coding tool in future video coding standards (e.g., ECM (Enhanced Compression Model)).

GPM includes a plurality of split modes that each define an edge that divides a current block into two or more partitions. A video encoder signals information indicative of the split mode, and a video decoder receives information indicative of the split mode so that both the video encoder and the video decoder partition the current block in the same manner. This disclosure describes example ways in which to determine which split mode is used for encoding or decoding the current block in a manner that makes use of the likelihood of the current block being encoded or decoded in accordance with an edge of a particular split mode.

The likelihood of a split mode being used may vary, and may be based on a cost (e.g., in term of rate-distortion or number of bits that need to be signaled, etc.). That is, split modes having lower costs are more likely to be used as compared to split modes having higher costs. In one or more examples, the video encoder and the video decoder may construct a mapping list having values indicative of the respective split modes based on respective costs associated with the respective split modes. The video encoder may signal an index value into the mapping list that identifies a value stored in the mapping list, and based on the identified value, the video decoder may determine a split mode of the plurality of split modes.

In one or more examples, signaling smaller valued indices may require fewer bits than signaling larger valued indices. By constructing the mapping list such that split modes having higher likelihood of being used are associated with smaller valued indices, there is a greater chance that the video encoder signals smaller values for the index value into the mapping list, as compared to if the mapping list were arranged without accounting for likelihood of a split mode being used. In this manner, the example techniques may provide a practical application that improves bandwidth utilization (e.g., promotes reduced bandwidth utilization) in the technology of video coding.

In one example, the disclosure describes a method of encoding or decoding video data, the method comprising: determining that geometric partition mode is enabled for a current block of the video data, the geometric partition mode comprising a plurality of split modes that each defines an edge for partitioning; for each split mode among at least two of the plurality of split modes, determining a respective cost associated with a respective split mode; constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determining a split mode amongst the plurality of split modes within the mapping list; and reconstructing a current block of the video data based on the split mode.

In one example, the disclosure describes a device for encoding or decoding video data, the device comprising: memory configured to store video data; and processing circuitry coupled to the memory and configured to: determine that geometric partition mode is enabled for a current block of the video data, the geometric partition mode comprising a plurality of split modes that each defines an edge for partitioning; for each split mode among at least two of the plurality of split modes, determine a respective cost associated with a respective split mode; construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determine a split mode amongst the plurality of split modes within the mapping list; and reconstruct a current block of the video data based on the split mode.

In one example, the disclosure describes a computer-readable storage medium storing instructions thereon that when executed cause one or more processors for encoding or decoding video data to: determine that geometric partition mode is enabled for a current block of the video data, the geometric partition mode comprising a plurality of split modes that each defines an edge for partitioning; for each split mode among at least two of the plurality of split modes, determine a respective cost associated with a respective split mode; construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determine a split mode amongst the plurality of split modes within the mapping list; and reconstruct a current block of the video data based on the split mode.

In one example, the disclosure describes a device for encoding or decoding video data, the device comprising: means for determining that geometric partition mode is enabled for a current block of the video data, the geometric partition mode comprising a plurality of split modes that each defines an edge for partitioning; for each split mode among at least two of the plurality of split modes, means for determining a respective cost associated with a respective split mode; means for constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; means for determining a split mode amongst the plurality of split modes within the mapping list; and means for reconstructing a current block of the video data based on the split mode.

The details of one or more examples are set forth in the accompanying drawings and the description below. Other features, objects, and advantages will be apparent from the description, drawings, and claims.

BRIEF DESCRIPTION OF DRAWINGS

FIGS. 5A and 5B are conceptual diagrams illustrating temporal motion vector candidate (TMVP) scaling and motion vector scaling, respectively.

DETAILED DESCRIPTION

Figure 1:
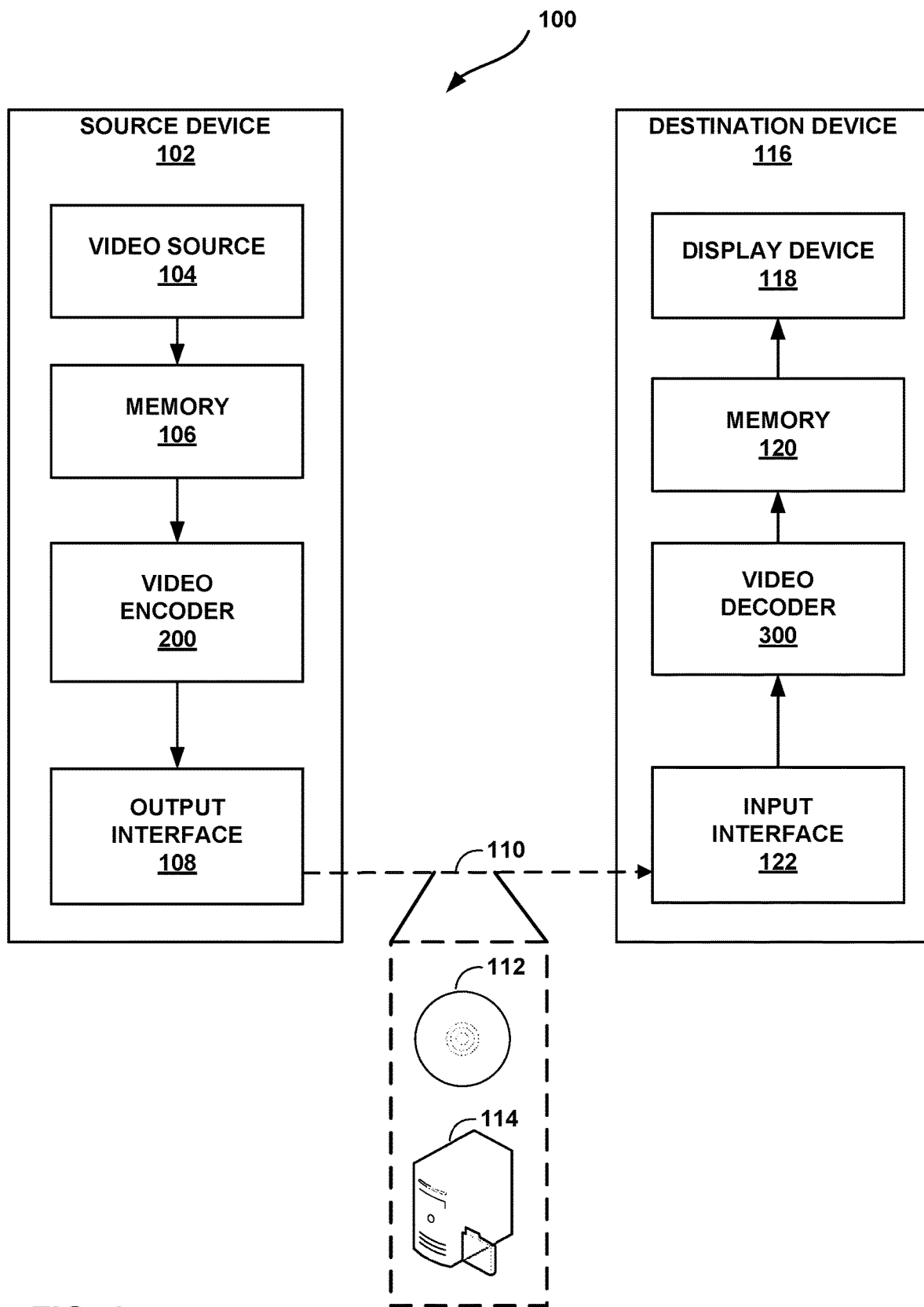
FIG. 1 is a block diagram illustrating an example video encoding and decoding system that may perform the techniques of this disclosure.

In geometric partition mode (GEO) or (GPM), a current block is split into at least two parts by one or more geometrically located straight edge(s). In this disclosure, the acronym GEO and GPM are interchangeable.

The straight edge may intersect two different edges of the current block (e.g., line from top edge to bottom edge at different angles, line from right edge to top edge at different angles, line from right edge to bottom edge at different angles, line from right edge to left edge at different angles, line from left edge to top edge at different angles, and line from left edge to bottom edge at different angles). Each of these example edges (e.g., lines) may be considered as a split mode of GEO. A video encoder may signal information to a video decoder indicative of the split mode.

In some techniques, a fixed-length coding structure of GEO split modes is utilized in which each split mode is considered to be equal-probable. However, such techniques may be suboptimal in terms of codeword length because such techniques may not utilize information from neighboring pixels (e.g., causal neighboring pixels of a reference picture) to predict an edge direction of the edge (e.g., split mode) of the current block. Accordingly, the syntax design from GEO splitting modes, in such techniques, may result in signaling longer codewords than necessary, which can result in inefficient bandwidth utilization.

This disclosure describes example techniques for signaling and parsing information for GEO split modes that may promote efficient bandwidth utilization. The example techniques may utilize one or more of syntax reordering for GEO split mode using grouping and/or cost (e.g., template matching (TM) cost) based syntax reordering for GEO split modes. The disclosure also describes techniques related to cost calculation, usage of GEO weights for blending reference block templates, the application of GEO+TM mode, the interaction between reference picture resampling and TM-cost based GEO split mode reordering, and various extensions.

In some existing techniques, the video encoder would signal a value (e.g., between 0 to 63), where each value is associated with a particular split mode. The video decoder may then partition the current block based on an edge defined by the split mode associated with the signaled value.

This disclosure describes example ways to construct a mapping list that reorders the split modes so that split modes that are more likely to be used are arranged to have a lower index value into the mapping list than split modes that are less likely to be used. For instance, assume that split mode 15 (e.g., split mode having value associated with 15) is more likely to be the split mode than split mode 5. In this example, the video encoder and the video decoder may construct the mapping list such that split mode 15 is associated with a lower index value (e.g., index 0 in the mapping list) than split mode 5 (e.g., index 4 in the mapping list).

To determine that a split mode is more likely to be used than another split mode, the video encoder and the video decoder may determine respective costs associated with the split modes. For example, for each split mode among at least two of the plurality of split modes (e.g., a subset or all of the plurality of split modes), the video encoder and the video decoder may determine a respective cost associated with the respective split mode. The video encoder and the video decoder may construct a mapping list having values indicative of the respective split modes (e.g., split mode 5 and split mode 15 from above example) based on respective costs associated with the respective split modes (e.g., lower cost split modes are identified first and have lower index value in the mapping list, and higher cost split modes are identified later and have higher index value in the mapping list). That is, the video encoder and the video decoder may construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list.

One example way of determining the cost of split modes is to determine respective templates based on respective split modes. In one or more examples, the respective template for determining a respective cost of each respective split mode may be formed based on samples that neighbor the respective reference blocks, where the reference blocks are identified by motion vectors of the partitions of the current block. For instance, the respective split modes may define which samples to use from samples that neighbor the respective reference blocks to form the respective templates.

The video encoder and the video decoder may compare the respective template for the respective split mode to a current template for the current block to determine the respective cost of the respective split mode. For instance, the video encoder and the video decoder may generate a first reference template for a first split mode, and compare the first reference template to the current template to determine a first cost of the first split mode. The video encoder and the video decoder may generate a second reference template for a second split mode, and compare the second reference template to the current template to determine a second cost of the second split mode.

The video encoder and video decoder may arrange the value that identifies the first split mode and the value that identifies the second split mode in the mapping list based on the first cost and the second cost. For instance, if the first cost is less than the second cost, then the video encoder and the video decoder may include the first split mode at a lower index value in the mapping list than the second split mode. If the first cost is greater than the second cost, then the video encoder and the video decoder may include the first split mode at a higher index value in the mapping list than the second split mode.

The video encoder and the video decoder may repeat such operations for all or a subset of the plurality of split modes to construct the mapping list. In some examples, the mapping list may identify the 32 most likely split modes.

In this manner, the video encoder and the video decoder may both construct the same mapping list. The video encoder may signal an index value into the mapping list that the video decoder uses to determine the split mode for the current block. The video decoder may then partition the current block based on the edge defined by the split mode, and reconstruct the current block based on the split mode (e.g., determined split mode).

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for syntax ordering in geometric partition mode (GEO), also called GPM, in video coding, such as techniques for signaling and parsing the syntax (e.g., split mode, candidate index, MVD (motion vector difference) offsets) that is used to identify the parameters of geometric partition modes (e.g., geometric partition mode (GEO), GEO+ MMVD (merge motion vector difference, GEO+TM (template matching) modes). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for techniques for signaling and parsing the syntax that is used to identify the parameters of geometric partition modes. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use geometric prediction mode (GEO).

In GEO (i.e., GPM), as described above, a current block is split into two parts by a geometrically located straight edge (e.g., straight line). The straight edge may intersect two different edges of the current block (e.g., line from top edge to bottom edge at different angles, line from right edge to top edge at different angles, line from right edge to bottom edge at different angles, line from right edge to left edge at different angles, line from left edge to top edge at different angles, and line from left edge to bottom edge at different angles). Each of these example lines may be considered as a split mode of GEO. A video encoder may signal information to a video decoder indicative of the splitting mode.

This disclosure describes example ways in which to reduce the overhead associated with signaling information related to GEO. For instance, as described in more detail below, index values used to identify which of the split modes to use (e.g., the angle and offset of the line that splits the current block) may be grouped and rearranged. For instance, video encoder 200 and video decoder 300 may access from memory a mapping table (e.g., mapping list) in which two or more GEO split modes are grouped together (e.g., to have the same index value in the mapping table). As one example, the two or more GEO modes may be grouped together based on the two or more GEO split modes having a same offset index and angles that are approximately perpendicular to each other. A number of GEO split modes is equal to M, a number of split modes in each group of the two or more GEO split modes is equal to K, and K is less than M. Accordingly, there may be M/K groups. The M/K groups may be identifiable by respective index values. In this way, the signaling overhead may be reduced since there are fewer index values (e.g., M/K indices is less than M indices).

Once video encoder 200 or video decoder 300 identify a group by an index value (e.g., one of the groups having K split modes), video encoder 200 or video decoder 300 may determine a split mode from the K split modes in the group. For instance, each of the K split modes may be identifiable by respective sub-mode index values.

In some examples, video encoder 200 and video decoder may reorder the K split modes in the group based on a cost value (e.g., template matching (TM) cost), such that split modes having lower cost are associated with a lower sub-mode index value. Split modes having lower cost may have a higher likelihood of being selected. Accordingly, the sub-mode index value, for split modes with lower cost, being smaller than the sub-mode index value, for split modes with higher cost, may result in video encoder 200 more likely signaling lower index values. In general, signaling lower index values may require less overhead than larger index values. Therefore, in one or more examples, the disclosure describes example ways in which to reduce the amount of data that is signaled, promoting efficient bandwidth.

In the above examples, video encoder 200 and video decoder 300 may access a mapping table (e.g., mapping list) with split modes grouped together. However, the example techniques are not so limited. In some examples, video encoder 200 and video decoder 300 may determine a cost (e.g., TM cost) associated with the split modes (e.g., M split modes), and possibly, although not required, before and without any grouping. Video encoder 200 and video decoder 300 may construct a mapping table (e.g., mapping list) based on the cost. For example, video encoder 200 and video decoder 300 may order the split modes in ascending order starting with the split mode having lowest cost (e.g., the index values for the split modes having the lowest cost is lower than the index values for the split modes having higher cost).

Video encoder 200 and video decoder 300 may determine a split mode from the constructed mapping table (e.g., mapping list). In some examples, it may be possible for video encoder 200 and video decoder 300 to then group the split modes (e.g., based on GEO split modes having a same offset index and angles that are approximately perpendicular to each other). That is, video encoder 200 and video decoder 300 may first determine cost (e.g., TM cost but other cost values are possible) and construct a mapping table (e.g., mapping list), and then perform grouping. However, as described further below, it may be possible to group split modes first, and then determine cost. Also, in some examples, video encoder 200 and video decoder 300 may determine cost and construct a mapping list without any grouping of split modes.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video decoder 300 may be configured to access from memory a mapping table (e.g., mapping list) in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M. In some examples, M is nonzero. K may be nonzero, but possible for K to be zero. Video decoder 300 may be configured to determine a split mode of the plurality of split modes from the mapping table, and reconstruct a current block of the video data based on the split mode (e.g., determined split mode).

In one example, video encoder 200 may be configured to access from memory a mapping table (e.g., mapping list) in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M. Video encoder 200 may be configured to determine a split mode from the mapping table, and signal an index value into the mapping table indicative of the split mode for decoding a current block of the video data.

In one example, video decoder 300 may be configured to determine respective costs (e.g., TM costs) associated with one or more split modes of geometric partition mode (GEO), construct a mapping table (e.g., mapping list) having values indicative of the respective split modes based on the respective costs for the one or more split modes of GEO, determine a split mode of the plurality of split modes based on the mapping table (e.g., mapping list), and reconstruct a current block of the video data based on the split mode (e.g., determined split mode).

In one example, video encoder 200 may be configured to determine respective costs associated with one or more split modes of geometric partition mode (GEO), construct a mapping table (e.g., mapping list) having values indicative of the respective split modes based on the respective cost for the one or more split modes of GEO, determine a split mode of the plurality of split modes based on the mapping table, and signal an index (e.g., index value) into the mapping table indicative of the split mode for decoding a current block of the video data.

The following provides some background related to video coding standards and different prediction modes. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from http://phenix.int-cvry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are working together on in a joint collaboration effort known as the Joint Video Exploration Team (JVET) to evaluate compression technology designs proposed by their experts in this area. The latest version of reference software, i.e., VVC Test Model 10 (VTM 10) could be downloaded from: https://vcgit.hhi.fraunhofer.de/jvet/VVCSoftware_VTM. The Versatile Video Coding (VVC) draft specification could be referred to JVET-T2001 by Bross et al. "Versatile Video Coding Editorial Refinements on Draft 10" JVET of ITU-T SG 16 WP 3 and ISO/IEC JTC 1/SC 29 $20^{th}$ Meeting, by teleconference, 7-16 Oct. 2020. Algorithm description of Versatile Video Coding and Test Model 10 (VTM 10.0) could be referred to JVET-T2002.

In HEVC, the largest coding unit in a slice is called a coding tree block (CTB) or coding tree unit (CTU). A CTB contains a quad-tree the nodes of which are coding units.

The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, i.e. inter or intra. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU.

When the CU is inter coded, each PU has one set of motion information, which is derived with a unique inter prediction mode. In the HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

The candidates for both modes are derived similarly from the same spatial and temporal neighboring blocks.

Figure 4B:
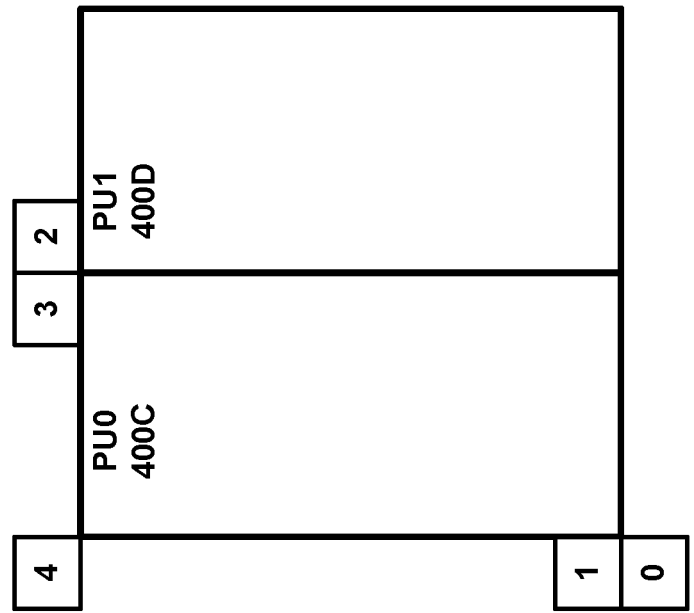
FIGS. 4A and 4B are conceptual diagrams illustrating spatial neighboring motion vector (MV) candidates for merge mode and advanced motion vector prediction (AMVP) mode, respectively.
Figure 4A:
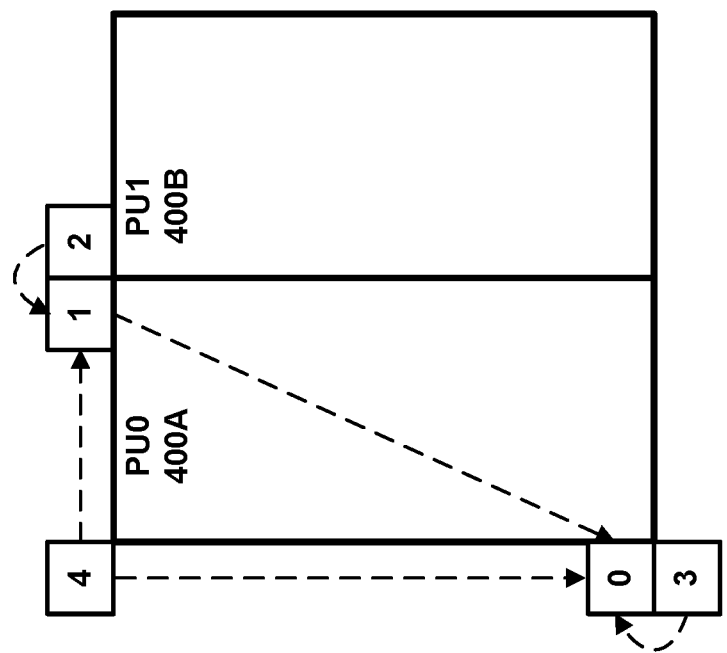

Spatial MV candidates are derived from the neighboring blocks shown FIGS. 4A and 4B, for a specific PU ($PU_0$), although the methods generating the candidates from the blocks differ for merge and AMVP modes. For instance, FIG. 4A illustrates PU0 400A and PU1 400B, and the neighboring blocks for PU0 400A. FIG. 4B illustrates PU0 400C and PU1 400D, and the neighboring blocks for PU0 400C.

In merge mode, up to four spatial MV candidates can be derived with the orders showed in FIG. 4A with numbers, and the order is the following: left (0, A1), above (1, B1), above right (2, B0), below left (3, A0), and above left (4, B2), as shown in FIG. 4A.

FIG. 4B shows the order but for AMVP mode. In AVMP mode, the neighboring blocks are divided into two groups: left group consisting of the block 0 and 1, and above group consisting of the blocks 2, 3, and 4 as shown in FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus the temporal distance differences can be compensated.

Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 5A as a block "T" (i.e., block 500), to compensate the bias to the above and left blocks used to generate spatial neighboring candidates. However, if that block is located outside of the current CTB row or motion information is not available (e.g., as indicated as block 502 with cross through), the block is substituted with a center block of the PU, illustrated as block 504.

A motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV may need to be scaled to compensate the temporal distance differences, as shown in FIG. 5B.

The following describes some other aspects of motion prediction in HEVC. Several aspects of merge and AMVP modes are worth mentioning as follows.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates are generated and inserted at the end of the list until it will have all candidates. In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. The pruning processing includes comparing one candidate against the others in the current candidate list to avoid inserting identical candidate in certain extent. To reduce the complexity, only limited numbers of pruning process is applied instead of comparing each potential one with all the other existing ones.

The following describes reference picture resampling. In HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded. In order to avoid additional processing steps, the RPR process in VVC is designed to be embedded in the motion compensation process and performed at the block level. In the motion compensation stage, the scaling ratio is used together with motion information to locate the reference samples in the reference picture to be used in the interpolation process.

In VVC, the scaling ratio is restricted to be larger than or equal to ½ (2 times down-sampling from the reference picture to the current picture), and less than or equal to 8 (8 times up-sampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is the same as the case of motion compensation interpolation filters. The filter set of normal motion compensation (MC) interpolation may be used in the case of scaling ratio ranging from 1/1.25 to 8. The normal MC interpolation process may be considered as a special case of the resampling process with scaling ratio ranging from 1/1.25 to 8. In addition to conventional translational block motion, the affine mode has three sets of 6-tap interpolation filters that are used for the luma component to cover the different scaling ratios in RPR. The horizontal and vertical scaling ratios are derived based on picture width and height, and the left, right, top and bottom scaling offsets specified for the reference picture and the current picture.

For support of this feature, the picture resolution and the corresponding conformance window are signalled in the PPS (picture parameter set) instead of in the SPS (sequence parameter set), while in the SPS the maximum picture resolution is signalled.

The following describes geometric partition mode (GEO), also called GPM. In VVC, a geometric partition mode is supported for inter prediction. When this mode is used, a CU is split into two parts by a geometrically located straight line (e.g., straight edge) shown in FIG. 6.

Figure 6:
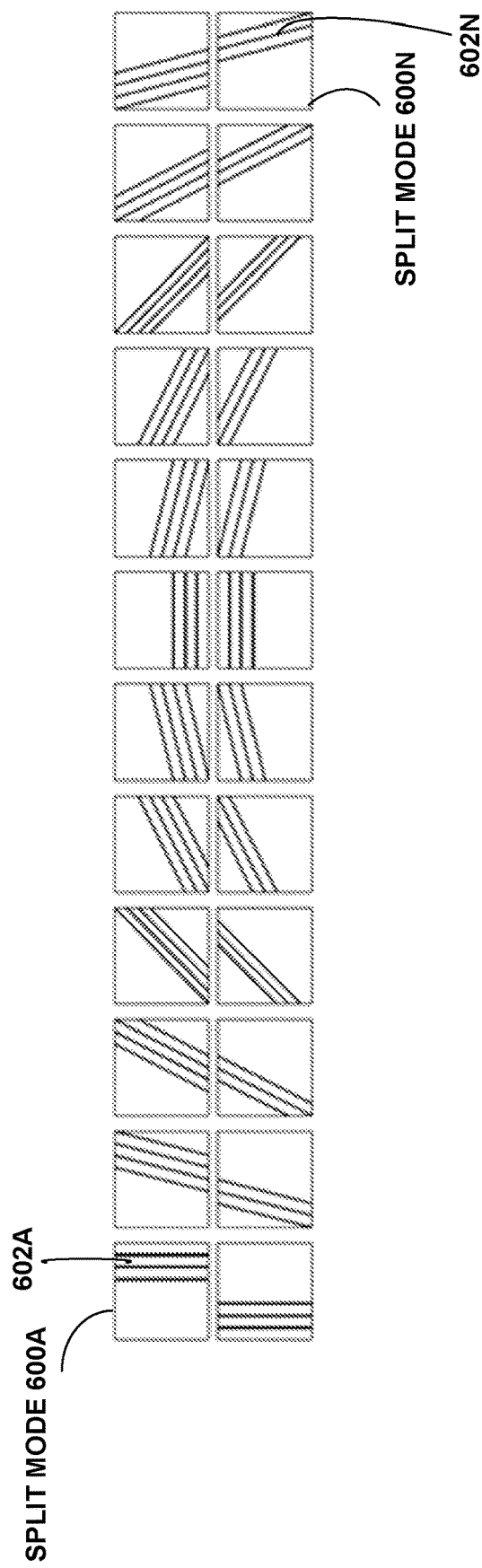
FIG. 6 is a conceptual diagram illustrating examples of partitions for geometric partition mode (GEO).

For instance, FIG. 6 illustrates split mode 600A to 600N. Each of split modes 600A-600N define an edge (e.g., straight line) that partitions a current block. For instance, FIG. 6 illustrates edge 602A, also called straight line 602A for split mode 600A, and edge 602N, also called straight line 602N for split mode 600N. Edge 602A of split mode 600A is one example way to partition a current block into two partitions, and similarly edge 602N of split mode 600B is another example way to partition a current block into two partitions.

In the example of FIG. 6, there are two lines that are parallel to edge 602A and two lines that are parallel to edge 602N, as well as the other edges. In one or more examples, the two lines that are parallel to respective edges form the area where samples from reference blocks are blended together (e.g., average weighted) to form the prediction block. For instance, for each partition, there may be a motion vector that identifies a reference block. If there are two partitions, then there may be two reference blocks. To generate a prediction block, video encoder 200 and video decoder 300 may utilize samples from the two reference blocks, and for generating samples of the prediction block that correspond to locations within the two lines that are parallel to an edge, video encoder 200 and video decoder 300 may blend samples from the two reference blocks. For samples of the prediction block that correspond to locations outside of the two lines that are parallel to an edge, video encoder 200 and video decoder 300 may utilize samples of one of the two reference blocks to form the prediction block.

In one or more examples, video encoder 200 may determine a motion vector for each of the two partitions (e.g., first motion vector for first partition and second motion vector for second partition). Video encoder 200 may signal information indicative of the motion vectors that video decoder 300 receives. Video encoder 200 and video decoder 300 may determine a first reference block based on the first motion vector and a second reference block based on the second motion vector, and combine samples from the first reference block and the second reference blocks to generate a prediction block for the current block.

To combine samples from the first reference block and the second reference block, video encoder 200 and video decoder 300 may perform a weighted blending. For instance, assume that split mode 600A is being used. For samples relatively distant from edge 602A, video encoder 200 and video decoder 300 may use corresponding samples from one of the first or second reference blocks, without blending, to generate a corresponding prediction sample in the prediction block. For samples relatively close to edge 602A, video encoder 200 and video decoder 300 may weighted average samples from the first and second reference blocks to generate a corresponding prediction sample in the prediction block. The area that is "relatively close" to edge 602A may be defined by the area between two lines parallel to edge 602A. Video encoder 200 and video decoder 300 may perform similar operations to generate a prediction block for the other split mode examples.

The location of the splitting line (e.g., splitting edge) is mathematically derived from the angle and offset parameters of a specific partition. In VVC, there are 64 split modes, and may be organized in order by angles (from smaller one to larger one) firstly and offsets (from smaller one to larger one) secondly, and each setting of angle-offset is assigned with a value (i.e., 0 to 63) that is binarized using fixed-length code with each bin bypass-coded. The fixed-length code is a full-tree structure with 6 bins at each tree leaf node. The below table shows how a split mode value is mapped to angle-offset, where the N-th angle mode (i.e., N=0, . . . , 7 or 16, . . . , 23) is physically with an edge that is perpendicular to that of (N+8)-th angle mode. Each part of a geometric partition in the CU is inter-predicted using its own motion; only uni-prediction is allowed for each partition, that is, each part has one motion vector and one reference index.

In the below table 1, the horizontal axis is for the angle. The vertical axis is for the offset.

As specified in VVC spec (JVET-T2001), the derivation process of GEO weights is specified in the subclause 8.5.7.2 (Weighted sample prediction process for geometric partitioning mode)
Inputs to this process are:
two variables nCbW and nCbH specifying the width and the height of the current coding block,
two (nCbW)×(nCbH) arrays predSamplesLA and predSamplesLB,
a variable angleIdx specifying the angle index of the geometric partition,
a variable distanceIdx specifying the distance index of the geometric partition,
a variable cIdx specifying colour component index.
Output of this process is the (nCbW)×(nCbH) array pbSamples of prediction sample values.

The variables nW, nH, shift1, offset1, displacementX, displacementY, partFlip and shiftHor are derived as follows:

$$nW = (cIdx == 0)\,?\,nCbW : nCbW * SubWidthC \qquad (990)$$

$$nH = (cIdx == 0)\,?\,nCbH : nCbH * SubHeightC \qquad (991)$$

TABLE 1

|   | 0 | 1 | 2 | 3 | 4  | 5  | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|----|----|---|---|---|---|----|----|----|----|----|----|----|----|----|----|----|----|----|----|----|----|----|----|----|----|----|----|
| 0 | X | X | 2 | 6 | 10 | 14 | X | X | X | X | X  | 20 | 24 | 28 | 32 | X  | X  | X  | X  | X  | X  | X  | X  | X  | X  | X  | X  | X  | X  | X  | X  | X  |
| 1 | 0 | X | 3 | 7 | 11 | 15 | X | X | 18 | X | X | 21 | 25 | 29 | 33 | X  | 36 | X  | 38 | 41 | 44 | 47 | X  | X  | 50 | X  | X  | 52 | 55 | 58 | 61 | X  |
| 2 | X | X | 4 | 8 | 12 | 16 | X | X | X | X | X  | 22 | 26 | 30 | 34 | X  | X  | X  | 39 | 42 | 45 | 48 | X  | X  | X  | X  | X  | 53 | 56 | 59 | 62 | X  |
| 3 | 1 | X | 5 | 9 | 13 | 17 | X | X | 19 | X | X | 23 | 27 | 31 | 35 | X  | 37 | X  | 40 | 43 | 46 | 49 | X  | X  | 51 | X  | X  | 54 | 57 | 60 | 63 | X  |

For instance, video encoder 200 and video decoder 300 may store table 1. Video encoder 200 may signal a value (e.g., 13). In this example, video decoder 300 may receive the value of 13, and determine, based on table 1, that the split mode value of 13 maps to an angle of 4, and an offset of 3. As another example, a split mode value of 38, as indicated by table 1, maps to an angle of 18, and an offset of 1. The "x" in table 1 means that no such edge is supported.

The uni-prediction candidate list for GEO mode is derived directly from the regular merge candidate list. Denote n as the index of the uni-prediction motion in the geometric uni-prediction candidate list. The LX motion vector of the n-th merge candidate, with X equal to the parity (even or odd) of n, is used as the n-th uni-prediction motion vector for geometric partitioning mode. These motion vectors are marked with "x" in below table. In case a corresponding LX motion vector of the n-th extended merge candidate does not exist, the L(1-X) motion vector of the same candidate is used instead as the uni-prediction motion vector for geometric partitioning mode.

| Merge Index | L0 MV | L1 MV |
|---|---|---|
| 0 | X |   |
| 1 |   | X |
| 2 | X |   |
| 3 |   | X |
| 4 | X |   |

$$shift1 = \mathrm{Max}(5, 17 - BitDepth) \qquad (992)$$

$$offset1 = 1 \ll (shift1 - 1) \qquad (993)$$

$$displacementX = angleIdx \qquad (994)$$

$$displacementY(angleIdx + 8)\%32 \qquad (995)$$

$$partFlip = (angleIdx >= 13 \;\&\&\; angleIdx <= 27)\,?\,0:1 \qquad (996)$$

$$shiftHor = \qquad (997)$$

$$(angleIdx \% 16 == 8 || (angleIdx \% 16 != 0 \;\&\&\; nH >= nW))\,?\,0:1$$

The variables offsetX and offsetY are derived as follows:
If shiftHor is equal to 0, the following applies:

$$offsetX = (-nW) >> 1 \qquad (998)$$

$$offsetY = ((-nH) >> 1) + \qquad (999)$$

$$(angleIdx < 16\,?\,(distanceIdx * nH) >> 3 : -((distanceIdx * nH) >> 3))$$

Otherwise (shiftHor is equal to 1), the following applies:

$$offsetX = ((-nW) >> 1) + (angleIdx < 16?(distanceIdx * nW) >> \quad (1000)$$
$$3 : -((distanceIdx * nW) >> 3))$$
$$offsetY = (-nH) >> 1 \quad (1001)$$

The prediction samples pbSamples [x][y] with x=0 . . . nCbW−1 and y=0 . . . nCbH−1 are derived as follows:
The variables xL and yL are derived as follows:

$$xL = (cIDx == 0)?x : x * SubWidthC \quad (1002)$$
$$yL = (cIdx == 0)?y : y * SubHeightC \quad (1003)$$

The variable wValue specifying the weight of the prediction sample is derived based on the array disLut specified in Table 37 as follows:

$$weightIdx = (((xL + offsetX) \ll 1) + 1) * disLut[displacementX] + \quad (1004)$$
$$(((yL + offsetY) \ll 1) + 1) * disLut[displacementY]$$
$$weightIdxL = partFlip?32 + weightIdx : 32 - weightIdx \quad (1005)$$
$$wValue = Clip3(0, 8, (weightIdxL + 4) >> 3) \quad (1006)$$

The prediction sample values are derived as follows:

$$pbSamples[x][y] = \quad (1007)$$
$$Clip3(0, (1 \ll BitDepth) - 1, (predSamplesLA[x][y] * wValue +$$
$$predSamplesLB[x][y] * (8 - wValue) + offset1) >> shift1)$$

TABLE 37 of JVET-T2001-Specification of the geometric partitioning distance array disLut.

| idx | | | | | | | 0 | 1 | 2 | 3 | 4 |
|---|---|---|---|---|---|---|---|---|---|---|---|
| disLut[idx] | | | | | | | 2 | 4 | 4 | 8 | 8 |
| idx | 6 | 8 | 9 | 0 | 1 | 2 | 4 | 6 | 7 | 8 | 9 | 0 |
| disLut[idx] | 8 | 8 | 8 | 4 | 4 | 2 | | | | | |

The following describes adaptive reordering of merge candidates (ARMC). In ECM, the merge candidates are adaptively reordered with TM. The reordering method is applied to regular merge candidate list, TM merge candidate list, and affine merge candidate list (subblock merge candidate list excluding the SbTMVP candidate). For the TM merge mode, merge candidates are reordered before the TM refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on TM. For simplification, merge candidates in the last but not the first subgroup are not reordered.

The TM cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 7:
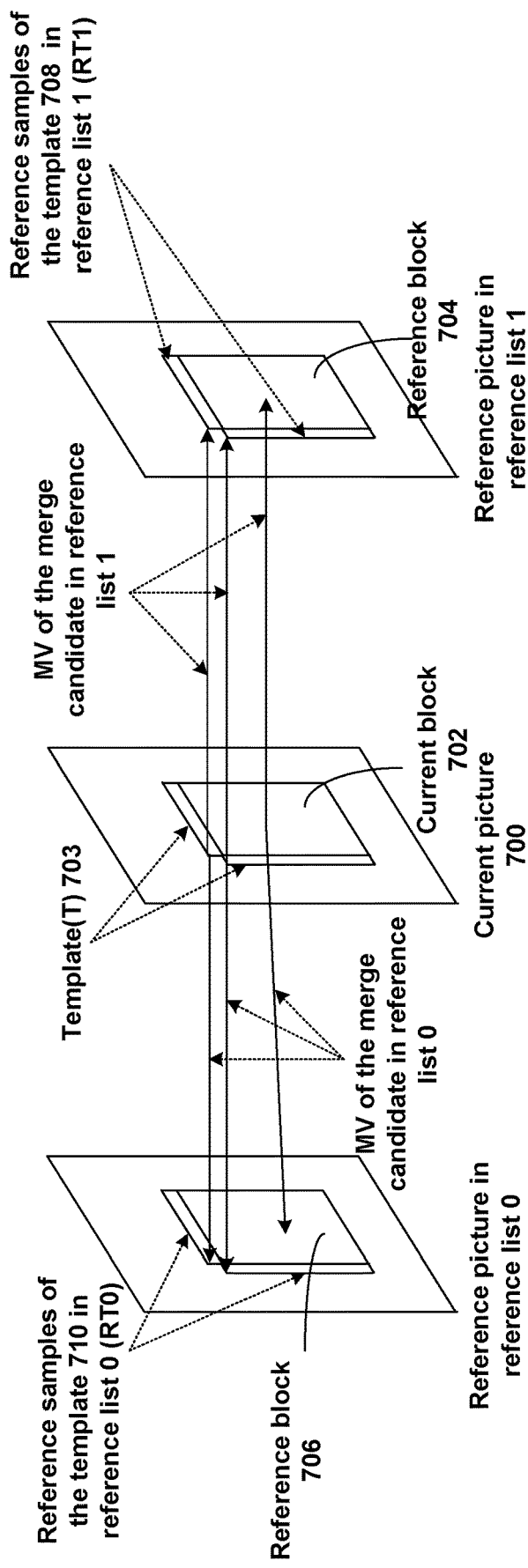
FIG. 7 is a conceptual diagram illustrating an example of template and reference samples of a template in reference pictures.

When a merge candidate utilizes bi-directional prediction, the reference samples of the template of the merge candidate are also generated by bi-prediction as shown in FIG. 7. For example, FIG. 7 illustrates current picture having current block 702, and template 703 that includes samples above and left of current block 702. A first motion vector points to reference block 704 that defines a first reference template 708 that includes samples above and left of reference block 704. A second motion vector points to reference block 706 that defines a second reference template 710 that includes samples above and left of reference block 706.

Figure 8:
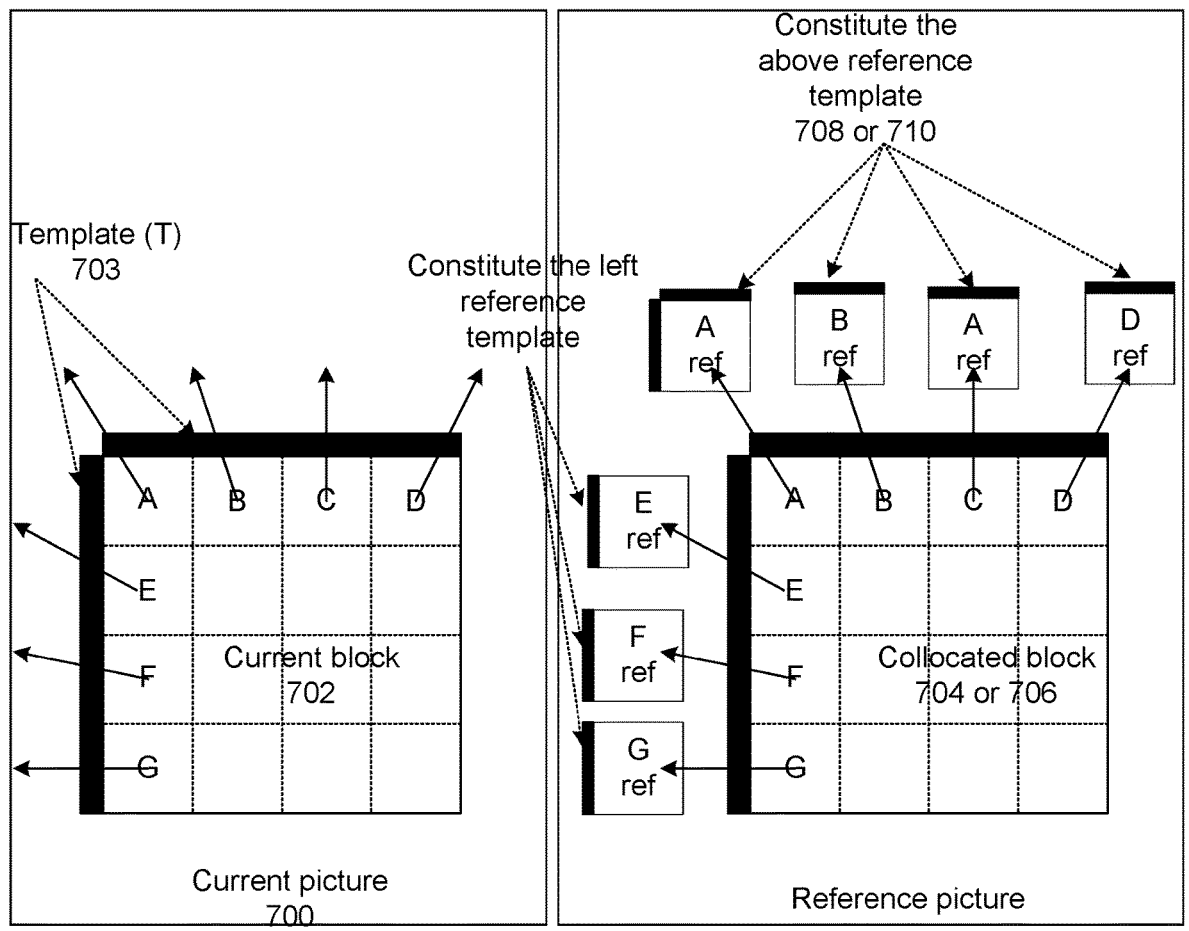
FIG. 8 is a conceptual diagram illustrating an example of template and reference samples of the template for block with sub-block motion using the motion information of the sub-blocks of the current block.

For subblock-based merge candidates with subblock size equal to Wsub×Hsub, the above template comprises several sub-templates with the size of Wsub×1, and the left template comprises several sub-templates with the size of 1×Hsub. As shown in FIG. 8, the motion information of the subblocks in the first row and the first column of current block is used to derive the reference samples of each sub-template.

For instance, in FIG. 8, the collocated block may be reference block 704 or 706 of FIG. 7. Reference template 708 or 710, of FIG. 7, as illustrated in FIG. 8, may include samples above and left of reference block 704 or 706.

The following describes template matching prediction. Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture.

Figure 9:
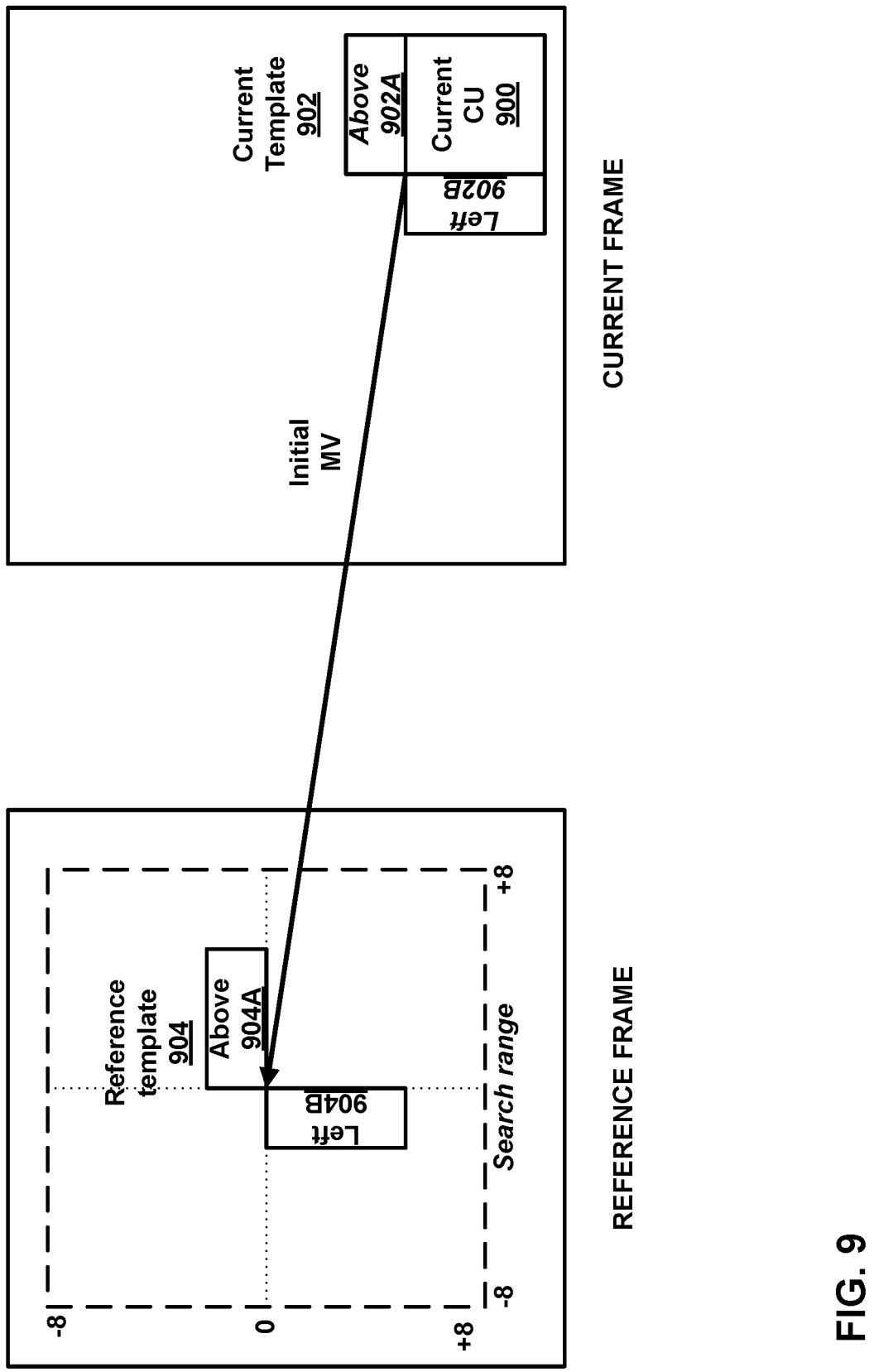
FIG. 9 is a conceptual diagram illustrating template matching on a search area around an initial MV.

As illustrated in FIG. 9, a better MV is to be searched around the initial motion of the current CU 900 within a [−8, +8]-pel search range. With an AMVP candidate selected based on initial matching error, its MVP is refined by template matching. With a merge candidate indicated by signaled merge index, its merged MVs corresponding to L0 and L1 are refined independently by template matching and then the less accurate one is further refined again with the better one as a prior.

Cost function: When a motion vector points to a fractional sample position, motion compensated interpolation is needed. To reduce complexity, bi-linear interpolation instead of regular 8-tap DCT-IF interpolation is used for both template matching to generate templates on reference pictures. The matching cost C of template matching is calculated as follows:

$$C = SAD + w * (|MVx - MV^s x| + |MVy - MV^s y|).$$

In the above, w is a weighting factor which can be set to an integer number such as 0, 1, 2, 3 or 4, and MV and MVs indicate the currently testing MV and the initial MV (e.g., a MVP candidate in AMVP mode or merged motion in merge mode), respectively. SAD is used as the matching cost of template matching.

When TM is used, motion is refined by using luma samples only. The derived motion may be used for both luma and chroma for MC inter prediction. After MV is decided, final MC is performed using 8-taps interpolation filter for luma and 4-taps interpolation filter for chroma Search method: MV refinement is a pattern-based MV search with the criterion of template matching cost and a hierarchical structure. Two search patterns are supported—a diamond search and a cross search for MV refinement. The hierarchical structure specifies an iterative process to refine MV, starting at a coarse MVD precision (e.g., quarter-pel) and ending at a fine one (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

Specifically, the template matching proposed in JVET-J0021: Chen et al. "Description of SDR, HDR and 360° video coding technology proposed by Qualcomm and Techincolor—low and high complexity versions," JVET of ITU-T SG 16 WP 3 and ISO/IEC JTC 1/SC 29/WG 11 10$^{th}$ meeting: San Diego, US 10-20 Apr. 2018 and JVET-U0100: Chang et al "Compression efficiency methods beyond VVC," JVET of ITU-T SG 16 WP 3 and ISO/IEC JTC 1/SC 29, 21$^{st}$ meeting, by teleconference, 6-15 Jan. 2021 is applied to AMVP mode and merge mode.

As an example, current template 902 includes a first portion 902A of samples above current CU 900 and a second portion 902B of samples left of current CU 900. Reference template 904 includes a first portion 904A of samples and a second portion 904B. For instance, the initial MV of current CU 900 may be considered as pointing to a reference block, and first portion 904A may be samples above the reference block, and second portion 904B may be samples left of the reference block.

Video encoder 200 and video decoder 300 may compare (e.g., determine a SAD) between current template 902 and reference template 904 as a first cost for the initial MV. Video encoder 200 and video decoder 300 may repeat such operations for different MVs for current CU 900, and determine respective costs for respective MVs. In some examples, the MV that results in the lowest cost may be considered as the MV for current CU 900.

The regular merge candidate list is constructed in the order of the following candidates:
a. Spatial MVPs from spatial neighbour CUs: first 4 available candidates are selected among the order of Above neighbour CU (A), Left neighbour CU (L), Above-Right neighbour CU (AR), Left-Below neighbour CU (LB), Left-Above neighbour CU (LA).
b. Temporal MVP from collocated CUs: Only one candidate is added.
c. History-based MVP: The motion information of a previously coded block is stored in a table and used as MVP for the current CU.
d. Pairwise average MVP: Pairwise average candidates are generated by averaging predefined pairs of candidates in the existing regular merge candidate list
e. Zero MVs.

When TM is applied to merge mode, a separate TM merge candidate list is constructed by refining the MVPs of the regular merge candidates based on the template matching.

The following describes Golomb-Rice coding. A Golomb-Rice code is a variable-length coding method, formed with a truncated unary coded prefix code and a fixed-length coded suffix code. The respective lengths of the prefix and suffix codes are controlled by a parameter, coded divisor D, where D is a positive power-of-2 number (e.g., 1, 2, 4, 8, . . . ) and is not larger than the total number of symbols to be coded.

When there are N different symbols to be coded by using Golomb-Rice code with a divisor D, the index of these N different symbols is decomposed into N/D groups and each group is with D symbols. The group index (e.g., 0, 1, 2, 3, . . . , N/D−1) is coded by using truncated unary code, which is the aforementioned prefix code. The index (e.g., 0, 1, 2, 3, . . . , D−1) of the D symbols in a group is then coded by using truncated binary code (when D is non-power-of-2) or fixed-length binary code (when D is a power-of-2 number), which is the aforementioned suffix code.

There may be some problems with techniques related to GEO (i.e., GPM). For instance, the fixed-length coding structure of GEO splitting modes, which treats each split mode as equal-probable, even if not, may not be optimal in terms of the codeword length. This may be because such techniques do not consider information that could be inferred from causal neighboring pixels (e.g., pixels in neighboring reference pictures) to predict the edge direction (e.g., split mode) of the current block. Accordingly, current syntax design for GEO splitting modes may not be optimal. This disclosure describes example techniques to improve the syntax design for GEO splitting modes that may promote efficient bandwidth utilization, and reduce signaling overhead and complexity.

In the following, for description-wise simplicity, if not otherwise stated, the mentioned cost (e.g., TM cost) can refer to the ARMC TM cost (with N-line template design associated with MVs before MV refinement) or the template matching cost (with N-line template design associated with MVs after MV refinement), where N could be 1, 2, 3, or more.

The following describes syntax reordering for GEO split modes using grouping. For instance, grouping methods for GEO split modes is described first. In one example, two GEO split modes can be grouped together if they are with the same offset index and their angles are nearly perpendicular to each other. For example, the paired modes are the n-th split mode and the (n+18)-th modes for n≤35 or the n-th split mode and (n+14)-th split mode for n>35. The following table is a reproduction of Table 1 from above. In some examples, table 1 shows how angle-offset is mapped to split mode index.

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|----|----|----|----|----|----|----|----|----|----|----|----|----|----|----|----|----|----|----|----|----|----|
| 0 | X | X | 2 | 6 | 10 | 14 | X | X | X | X | X | 20 | 24 | 28 | 32 | X | X | X | X | X | X | X | X | X | X | X | X | X | X | X | X | X |
| 1 | 0 | X | 3 | 7 | 11 | 15 | X | X | 18 | X | X | 21 | 25 | 29 | 33 | X | 36 | X | 38 | 41 | 44 | 47 | X | X | 50 | X | X | 52 | 55 | 58 | 61 | X |
| 2 | X | X | 4 | 8 | 12 | 16 | X | X | X | X | X | 22 | 26 | 30 | 34 | X | X | X | 39 | 42 | 45 | 48 | X | X | X | X | X | 53 | 56 | 59 | 62 | X |
| 3 | 1 | X | 5 | 9 | 13 | 17 | X | X | 19 | X | X | 23 | 27 | 31 | 35 | X | 37 | X | 40 | 43 | 46 | 49 | X | X | 51 | X | X | 54 | 57 | 60 | 63 | X |

The above mapping table can be arranged as follows for forward- and backward-mapping between the new split mode index and the original one. As seen, there are 32 new split mode indices in total. For example, (Angle index 0, Offset index 1) shares the sample split mode index as (Angle index 8, Offset index 1). That is, in below, a value of 0 maps to split mode 0 or split mode 18, and in table 1, split mode 0 maps to angle 0, offset 1, and split mode 18 maps to angle 8, offset 1.

| New Index Original | | | | | | | | | | | | | | | | |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 |
| 0 | 1 | 2 | 3 | 4 | 5 | 6 | 7 | 8 | 9 | 10 | 11 | 12 | 13 | 14 | 15 | 16 |
| 18 | 19 | 20 | 21 | 22 | 23 | 24 | 25 | 26 | 27 | 28 | 29 | 30 | 31 | 32 | 33 | 34 |
|  | 17 | 18 | 19 | 20 | 21 | 22 | 23 | 24 | 25 | 26 | 27 | 28 | 29 | 30 | 31 |  |
|  | 17 | 36 | 37 | 38 | 39 | 40 | 41 | 42 | 43 | 44 | 45 | 46 | 47 | 48 | 49 |  |
|  | 35 | 50 | 51 | 52 | 53 | 54 | 55 | 56 | 57 | 58 | 59 | 60 | 61 | 62 | 63 |  |

In another example, as a simplified mapping function of the above example, the n-th split mode is grouped with the (n+1)-th mode for n∈{0, 2, 4, . . . , M−2}, where M is the total number of original GEO split modes (e.g., 64 in VVC). The new split mode index assigned to n-th and (n+1)-th split mode is n/2. In total, there are 32 new split mode indices.

In another example, as a simplified mapping function of the above, the n-th split mode is grouped with the (n+M/2)-th mode for n∈{0, 1, 2, 3, . . . , (M/2)−1}, where M is the total number of original GEO split modes (e.g., 64 in VVC). The new split mode index assigned to n-th and (n+M/2)-th split mode is n. In total, there are 32 new split mode indices.

In another example, four GEO split modes can be grouped together to further reduce the number of new split mode index from 32 to 16. The below table shows the forward- and backward-mapping between the new split mode index and the original one. In total, there are 16 new split mode indices.

| New Index | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 0 | 1 | 2 | 3 | 4 | 5 | 6 | 7 | 8 | 36 | 37 | 38 | 39 | 40 | 41 | 42 |
| 9 | 10 | 11 | 12 | 13 | 14 | 15 | 16 | 17 | 43 | 44 | 45 | 46 | 47 | 48 | 49 |
| 18 | 19 | 20 | 21 | 22 | 23 | 24 | 25 | 26 | 50 | 51 | 52 | 53 | 54 | 55 | 56 |
| 27 | 28 | 29 | 30 | 31 | 32 | 33 | 34 | 35 | 57 | 58 | 59 | 60 | 61 | 62 | 63 |

In another example, as a simplified mapping function of the above example, the n-th, (n+1)-th, (n+2)-th and (n+3)-th split modes are grouped together for n∈{0, 4, 8, . . . , M−4}, where M is the total number of original GEO split modes (e.g., 64 in VVC). The new split mode index assigned to n-th, (n+1)-th, (n+2)-th and (n+3)-th split modes is n/4. In total, there are 16 new split mode indices.

In another example, as a simplified mapping function of the above example, the n-th, (n+M/4)-th, (n+2M/4)-th and (n+3M/4)-th split modes are grouped together for n∈{0, 1, 2, 3, . . . , (M/4)−1}, where M is the total number of original GEO split modes (e.g., 64 in VVC). The new split mode index assigned to the n-th, (n+M/4)-th, (n+2M/4)-th and (n+3M/4)-th split modes is n. In total, there are 16 new split mode indices.

In another example, as a generalized simplification for the mapping function, every K split modes can be grouped together, where K is a positive power-of-2 number (e.g., 2, 4, 8, 16, . . . ). Specifically, the n-th, (n+1)-th, . . . , and (n+K−1)-th split modes are grouped together for n∈{0, K, 2K, 3K, . . . , M−K}, where M is the total number of original GEO split modes (e.g., 64 in VVC). The new split mode index assigned to n-th, (n+1)-th, . . . , and (n+K−1)-th split modes is n/K. In total, there are M/K new split mode indices. It is noted that, in general, K is not larger than M.

In another example, as another generalized simplification for the mapping function, the n-th, (n+M/K)-th, (n+2M/K)-th, (n+3M/K)-th, . . . , and (n+ (K−1) M/K)-th split modes are grouped together for n∈{0, 1, 2, 3, . . . , (M/K)−1}, where M is the total number of original GEO split modes (e.g., 64 in VVC) and K is a positive power-of-2 number (e.g., 2, 4, 8, 16, . . . ). The new split mode index assigned to the n-th, (n+M/K)-th, (n+2M/K)-th, (n+3M/K)-th, . . . , and (n+(K−1) M/K)-th split modes is n. In total, there are M/K new split mode indices. It is noted that, in general, K is not larger than M.

The following describes grouping index signing methods and split mode derivation. After the grouping process as described above with grouping methods for GEO split modes is done, there are K split modes that are grouped together (where each group is assigned with a new split mode index as specified above in grouping methods for GEO split modes) and there are M/K groups thus formed, where M is the total number of original GEO split modes (e.g., 64 in VVC) and K is a positive power-of-2 number (e.g., 2, 4, 8, 16, . . . ) and K≤M. For example, each group includes K split modes, and there are a total of M split modes.

The below examples describe a variety of methods to indicate the value of M/K and also describe which of the split mode among the K modes are selected as the split mode of a coding block. To avoid confusion, this disclosure refers hereafter to the new split mode index as group index.

In one example, the group index (e.g., 0, 1, . . . , M/K−1) is fixed-length binary coded, and thus each group index is with the same number of codeword length, which is log 2 (M/K) bits. For example, when M=64 and K=4, there are 16 groups in total and thus each group is assigned with a 4-bit length codeword.

In another example, the group index (e.g., 0, 1, . . . , M/K−1) can be coded by using Golomb-Rice code with a divisor D (described with respect to Golomb-Rice above), where D can be 1, 2, 4, . . . , M/K.

In another example, the K split modes in a group can be ordered based on their original split mode index in ascending or descending order and a sub-mode index is thus assigned. Then, the sub-mode index is indicated in the bitstream by using fixed-length binary code.

In another example, instead of fixed-length code, the codeword of the sub-mode index can be replaced by using Golomb-Rice code with a divisor D (described with respect to Golomb-Rice above), where D can be 1, 2, 4, . . . , M/K.

In another example, instead of signalling bits in bitstream, the selection of sub-mode index can be derived based on TM cost. The TM cost can be computed for each sub-mode. The sub-mode in a group which can generate the lowest TM cost is selected. For example, for the grouping methods for GEO split modes, there may be an example in which video encoder 200 or video decoder 300 may choose group 0 which contains GEO split mode 0 and 18 that can be selected by comparing their respective TM costs and choosing the one which achieves the lowest TM cost accordingly.

In yet another example, the group index can also be reordered before it is signaled and covered back after it is parsed. At video encoder 200, after grouping is done, each sub-mode in a group can derive its own TM cost and the group index is reordered based on the best TM cost in each group. The reordered group index can then be signaled by using the aforementioned fixed-length binary code or Golomb-Rice code. At video decoder 300, after the reordered group index is parsed, the mapping table (e.g., mapping list) for group index reordering can be constructed in the same way as encoder does. The reordered group index relies on this mapping table to map the reordered group index back to the actual group index.

In yet another example, the prefix code that may be applied to group index, reordered group index and/or sub-mode index can be context-coded.

The following describes cost (e.g., TM cost) syntax reordering for GEO split modes. In some examples, the M split mode indices of geometric partition mode (e.g., GEO, MMVD-GEO, TM-GEO) can be reordered based on their respective cost before signaling, where M is a positive number (e.g., 64 in VVC).

In one example, the respective costs of the M split mode indices are computed firstly. That is, video encoder 200 and video decoder 300 may determine respective costs associated with respective split modes.

Depending on the TM cost, the M split modes are sorted in ascending order and a mapping table (e.g., mapping list) is thus constructed to map a split mode index into a reordering index and the other way around. The reordering index is an index into the mapping table, and the split mode index is a value indicative of a split mode. For instance, the split mode index is an index into table 1 above that indicates angle and offset for the edge of the split mode. Then, the reordering index is indicated in bitstream by using either fixed-length binary code or by using Golomb-Rice code with a divisor D (described with respect to Golomb-Rice above), where D can be 1, 2, 4, . . . , M. In some examples, divisor D is equal to 4.

Stated another way, for each split mode among at least two of the plurality of split modes (e.g., a subset or all of the plurality of split modes), video encoder 200 and video decoder 300 may determine a respective cost (e.g., TM cost) associated with the respective split mode, and construct a mapping list having values indicative of split modes (e.g., split mode index) based on the respective costs associated with the respective split modes. In this example, to construct the mapping list, video encoder 200 and video decoder 300 may order the values indicative of split modes in ascending order starting with the value indicative of the split mode having lowest cost to the value indicative of the split mode having highest cost. In such examples, split modes having lower costs may be associated with a lower index (i.e., reordering index noted above) in the mapping list and split modes having higher costs may be associated with a higher index in the mapping list. For instance, video encoder 200 and video decoder 300 may construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list.

In one or more examples, video decoder 300 may determine an index value into the mapping list (e.g., video encoder 200 may signal information indicative of the index value into the mapping list). The index value into the mapping list may be considered as a reordering index value since order of the values of the split mode are reordered based on respective costs. From the index value into the mapping list, video decoder 300 may determine a value indicative of the split mode. The value indicative of the split mode may be considered as a split mode index. For instance, video decoder 300 may use the value indicative of the split mode (e.g., the split mode index) as an index into table 1 above. From Table 1, video decoder 300 may determine the angle and offset of the edge defined by the split mode, and partition the current block accordingly.

As described above, video encoder 200 may encode the value of the index into the mapping list, and video decoder 300 may decode the value of the index. For instance, to determine the index value into the mapping list, video decoder 300 may at least one of fixed-length binary decode information indicative of the index value, truncated binary decode information indicative of the index value, Golomb-Rice decode information indicative of the index value, or context-based adaptive coding (CABAC) decode one or more bins of information indicative of the index value.

For instance, in some examples, video decoder 300 may CABAC decode all bins of the information indicative of the index value. In some examples, video decoder 300 may CABAC decode some of the bins of the information indicative of the index value, and other bins may be bypass decoded. In some examples in which some bins are CABAC decoded and other bins are bypass decoded, the leading bins may be CABAC decoded, and the latter bins may be bypass decoded.

In another example, the respective costs of the M split mode indices are computed firstly. Depending on the cost, the M split modes are sorted in ascending order and only the best N split modes are kept while others are all removed, where N≤M. A mapping table (e.g., mapping list) is thus constructed to map these best N split mode indices into respective reordering indices and the other way around. Then, the reordering index values is indicated in bitstream by using either fixed-length binary code (when N is power-of-2), truncated binary code (when N is non-power-of-2) or by using Golomb-Rice code with a divisor D (as described with for Golomb-Rice), where D can be 1, 2, 4, . . . , M.

Accordingly, in some examples, for each split mode among at least two of the plurality of split modes, video encoder 200 and video decoder 300 may determine a respective cost associated with the respective split mode, and construct a mapping list having values indicative of split modes based on respective costs associated with the respective split modes. However, video encoder 200 and video decoder 300 may limit the size of the mapping list to the best N split modes. The best N split modes may be the N split modes having the lowest cost. In some examples, the best N split modes may be 32 split modes.

For instance, the mapping list may include index values (e.g., index values in ascending order starting with 0). Each of the index values represents an entry in the mapping list, and each entry in the mapping list may store a value indicative of the split mode. For instance, index value 0 in the mapping list may refer to a first entry in the mapping list, and the first entry may store a first value indicative of a first split mode. Index value 1 in the mapping list may refer to a second entry in the mapping list, and the second entry may store a second value indicative of a second split mode, and so forth. Accordingly, the mapping list includes index values respectively associated with values indicative of the respective split modes.

In one or more examples, a lower index value in the mapping list is associated with a first split mode having a lower cost than a second split mode with a higher index value in the mapping list. For instance, as described above, the first value indicative of the first split mode may be stored in the entry in the mapping list identified by index value 0, and the second value indicative of the second split mode may be stored in the entry in the mapping list identified by index value 1. In this example, a first cost of the first split mode is less than a second cost of the second split mode.

In yet another example, the prefix of Golomb-Rice code that may be applied to reordering index can be context-coded. In yet another example, the configuration of the best N split modes can be CU-size dependent. Specially, the value of N of a larger block is generally larger than or equal to that of a smaller block. Alternatively, in another example, the value of N of a larger block can be smaller than or equal to that of a smaller block.

In yet another example, the aforementioned examples can be applied directly to the sub-mode index (described above with respect to syntax reordering for GEO split modes using grouping) in a group. Accordingly, the definition of M is replaced by using the number (e.g., the K value described above with respect to syntax reordering for GEO split using grouping) of GEO split modes in a group.

FIGS. 10A-10D are conceptual diagrams illustrating an example generating a reference template for determining a cost of a split mode. For instance, as described above, for each split mode among at least two of the plurality of split modes (e.g., subset or all of the split modes), video encoder 200 and video decoder 300 may determine a respective cost associated with the respective split mode, and then construct a mapping list having values indicative of the respective split modes based on respective costs associated with the respective split modes. For example, video encoder 200 and video decoder 300 may construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list. For instance, index value 0 may be associated with the value indicative of the split mode having the least cost, index value 1 may be associate with the value indicative of the split mode having the next least cost, and so forth.

The following describes example ways in which to determine a cost associated with a split mode. Video encoder 200 and video decoder 300 may repeat these example operations for a subset or possibly all of the plurality of split modes to determine respective costs associated with respective split modes.

Figure 10A:
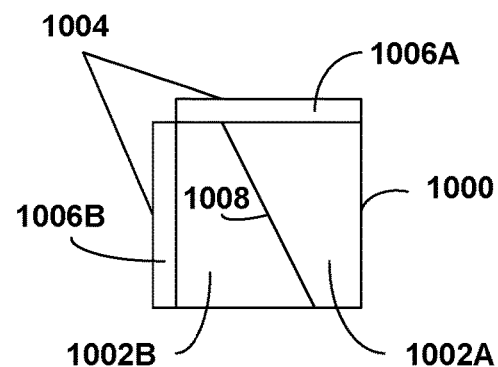
FIGS. 10A-10D are conceptual diagrams illustrating an example generating a reference template for determining a cost of a split mode.

FIG. 10A illustrates current block 1000. Video encoder 200 may determine that geometric partition mode is enabled for current block 1000, and signal such information to video decoder 300. Video decoder 300 may receive information indicating that geometric partition mode is enabled for current block 1000, and therefore, determine that geometric partition mode is enabled for current block 1000. As described above, and illustrated in FIG. 6, geometric partition mode includes a plurality of split modes that each define an edge for partitioning.

For instance, to determine respective costs associated with respective split modes, video encoder 200 and video decoder 300 may start with one of the plurality of split modes. As illustrated in FIG. 10A, video encoder 200 and video decoder 300 may set a current split mode for determining the cost of the split mode to be a split mode that defines edge 1008. That is, edge 1008 may correspond to a particular value indicative of a split mode. As an example, edge 1008 may define an angle and an offset that corresponds to a split mode index (e.g., value indicative of a split mode) in Table 1. For instance, edge 1008 may correspond to split mode A, where the value of A is one of the values in Table 1 that defines the angle and offset for edge 1008.

It should be understood that the split mode (e.g., split mode A) that defines edge 1008 need not necessarily be the actual split mode for current block 1000. Although it is possible that the split mode that defines edge 1008 ends up being the actual split mode for current block 1000. Rather, in FIGS. 10A-10D, the split mode that defines edge 1008 is a test split mode used to determine the cost associated with that split mode.

Video encoder 200 and video decoder 300 may determine a current template 1004 for current block 1000. For instance, current template 1004 may include samples that are above current block 1000 and samples that are left of current block 1000. As illustrated in FIG. 10A, current template 1004 may include an above portion 1006A and a left portion 1006B. Portions 1006A and 1006B together form current template 1004.

In accordance with one or more examples, video encoder 200 and video decoder 300 may determine a respective reference template based on the respective split mode that defines edge 1008. Video encoder 200 and video decoder 300 may determine a respective cost associate with the respective split mode that defines edge 1008 based on the respective reference template and current template 1004. An example of the respective reference template is reference template 1018 in FIG. 10D, and the following describes example ways in which to generate respective reference template 1018.

Figure 10B:
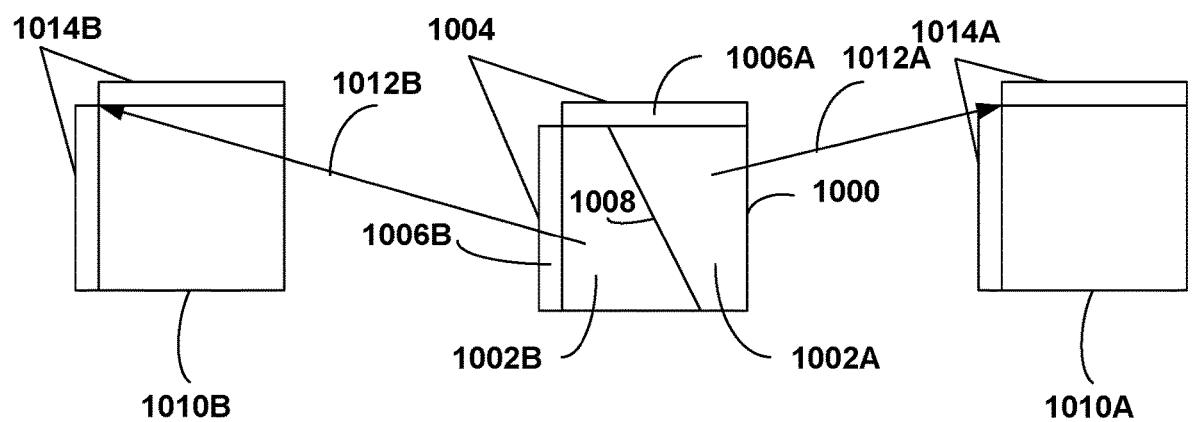

In FIG. 10A, edge 1008 partitions current block 1000 into first partition 1002A and second partition 1002B. As illustrated in FIG. 10B, first partition 1002A is associated with first motion vector 1012A, and second partition 1002B is associated with second motion vector 1012B.

From the perspective of video decoder 300, when determining the respective cost of the respective split mode, for each of split mode among the plurality of split modes, video decoder 300 may not have yet determined the split mode to use. However, video encoder 200 may have already signaled information indicative of the motion vectors for the partitions. In other words, video decoder 300 may determine that geometric partition mode is enabled for current block 1000, and therefore, current block 1000 is to be partitioned into two partitions, and each partition is to have a motion vector. Although video decoder 300 may not have determined the manner in which to partition current block 1000, video decoder 300 may have already determined what the motion vectors are going to be for each of the two partitions based on information signaled by video encoder 200 in the bitstream.

As illustrated in FIG. 10B, first motion vector 1012A identifies first reference block 1010A, and second motion vector 1012B identifies second reference block 1010B. In the example of FIG. 10B, first reference template 1014A includes a first portion of samples above first reference block 1010A and a second portion of samples left of first reference block 1010A. Second reference template 1014B includes a first portion of samples above second reference block 1010B and a second portion of samples left of second reference block 1010B. Accordingly, video encoder 200 and video decoder 300 may determine first reference template 1014A based on first reference block 1010A identified by first motion vector 1012A of first partition 1002A of current block 1000. Similarly, video encoder 200 and video decoder 300 may determine second reference template 1014B based on second reference block 1010B identified by second motion vector 1012B of second partition 1002B of current block 1000.

Figure 10C:
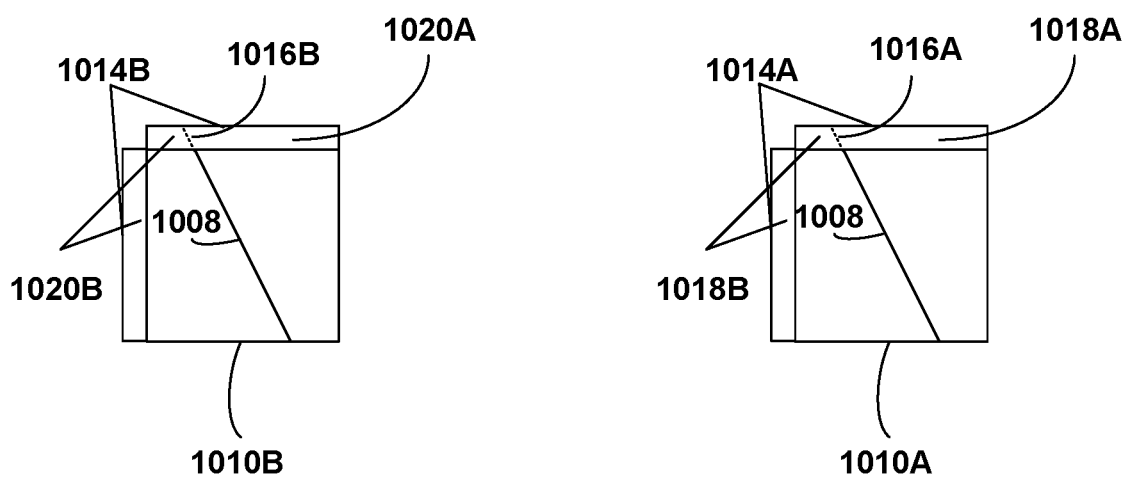

In one or more examples, video encoder 200 and video decoder 300 may combine samples from first reference template 1014A and second reference template 1014B based on the respective split mode to generate the respective reference template. For instance, with respect to the split mode that defines edge 1008, as illustrated in FIG. 10C, video encoder 200 and video decoder 300 may apply the split mode that defines edge 1008 to first reference block 1010A. That is, video encoder 200 and video decoder 300 may partition first reference block 1010A based on edge 1008.

Video encoder 200 and video decoder 300 may extend the applied split mode that defines edge 1008 to samples of first reference template 1014A. For instance, as illustrated in FIG. 10C with line 1016A, video encoder 200 and video decoder 300 may extend edge 1008 into the above portion of first reference template 1014A. In one or more examples, by extending the applied respective split mode to samples of first reference template 1014A, video encoder 200 and video decoder 300 may generate a first set of samples 1018A in the first reference template 1014A and a second set of samples 1018B in the first reference template 1014A.

Video encoder 200 and video decoder 300 may access a first set of samples in first reference template 1014A based on the extension of the applied split mode to the samples of first reference template 1014A. For instance, line 1016A partitions first reference template 1014A into a first portion and a second portion. As illustrated, first set of samples 1018A are in the first portion of the first reference template 1014A that is right of line 1016A, and second set of samples 1018B are in the second portion of the first reference template 1014A that is left of line 1016A.

In the example of FIG. 10C, the first set of samples 1018A in first reference template 1014A may be the samples that video encoder 200 and video decoder 300 access. For instance, the first portion that includes the first set of samples 1018A is based on the extension of the applied split mode to the samples of first reference template 1014A. Video encoder 200 and video decoder 300 may access the first set of samples 1018A for generating the reference template that is used to determine the cost of the split mode that defines edge 1008.

In one or more examples, video encoder 200 and video decoder 300 may access the first set of samples 1018A because first reference block 1010A is from motion vector 1012A of first partition 1002A. First partition 1002A is on the right side of current block 1000. Accordingly, video encoder 200 and video decoder 300 may access samples in the first portion because first portion (e.g., that includes first set of samples 1018A) is right of line 1016A. That is, the first portion is in the same direction relative to line 1016A that first partition 1002A is relative to edge 1008.

As also illustrated in FIG. 10C, video encoder 200 and video decoder 300 may apply the split mode that defines edge 1008 to second reference block 1010B. That is, video encoder 200 and video decoder 300 may partition second reference block 1010B based on edge 1008.

Video encoder 200 and video decoder 300 may extend the applied split mode that defines edge 1008 to samples of second reference template 1014B. For instance, as illustrated in FIG. 10C with line 1016B, video encoder 200 and video decoder 300 may extend edge 1008 into the above portion of second reference template 1014B. In one or more examples, by extending the applied respective split mode to samples of second reference template 1014B, video encoder 200 and video decoder 300 may generate a third set of samples 1020B in the second reference template 1014B and a fourth set of samples 1020A in the second reference template 1014B.

Video encoder 200 and video decoder 300 may access a third set of samples 1020B in second reference template 1014B based on the extension of the applied split mode to the samples of second reference template 1014B. For instance, line 1016B partitions second reference template 1014B into a first portion that includes fourth set of samples 1020A and a second portion that includes third set of samples 1020B. As illustrated, the first portion includes the portion of the second reference template 1014B that is right of line 1016B, and second portion includes the portion of the second reference template 1014B that is left of line 1016B.

In the example of FIG. 10C, the second portion includes the third set of samples 1020B in second reference template 1014B that video encoder 200 and video decoder 300 access. For instance, third set of samples 1020B are based on the extension of the applied split mode to the samples of second reference template 1014B. Video encoder 200 and video decoder 300 may access the third set of samples 1020B for generating the reference template that is used to determine the cost of the split mode that defines edge 1008.

In one or more examples, video encoder 200 and video decoder 300 may access samples in the portion that includes third set of samples 1020B because second reference block 1010B is from motion vector 1012B of second partition 1002B. Second partition 1002B is on the left side of current block 1000. Accordingly, video encoder 200 and video decoder 300 may access third set of samples 1020B because the portion that includes the third set of samples 1020B is left of line 1016B. That is, the portion that includes the third set of samples 1020B is in the same direction relative to line 1016B that second partition 1002B is relative to edge 1008.

Figure 10D:
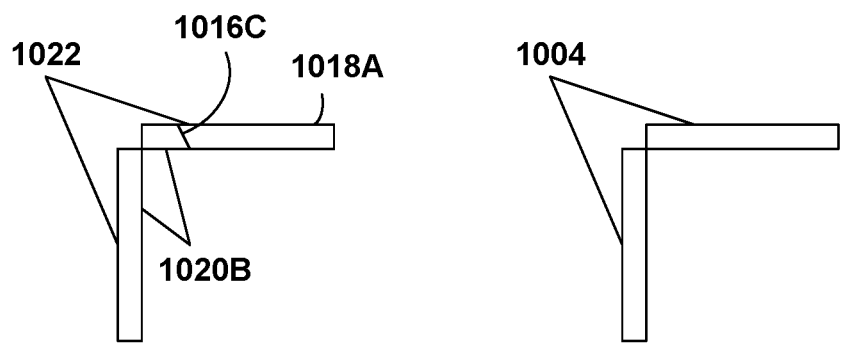

As illustrated in FIG. 10D, video encoder 200 and video decoder 300 may combine the first set of samples 1018A and the third set of samples 1020B to generate the reference template 1022 that is used to determine the cost of the split mode that defines edge 1008. For instance, as illustrated in FIG. 10D, the first set of samples 1018A and the third set of samples 1020B may together form reference template 1022.

For instance, simply to case with understanding, FIG. 10D illustrates line 1016C that corresponds to lines 1016A and 1016B. In reference template 1022, samples to the right of line 1016C are one or more samples from the first set of samples 1018A. In reference template 1022, samples to the left of line 1016C are one or more samples from third set of samples 1020B.

In the example of FIG. 10D, video encoder 200 and video decoder 300 may generate reference template 1022 by utilizing the sample values of samples in the first set of samples 1018A and samples in the second set of samples 1020B, possibly without any further filtering or weighting. However, the example techniques are not so limited. In some examples, such as for samples near line 1016C, video encoder 200 and video decoder 300 may blend one or more samples in the first set of samples 1018A with one or more samples in the fourth set of samples 1020A. For samples near line 1016C, video encoder 200 and video decoder 300 may blend one or more samples in the third set of samples 1020B with one or more samples in the second set of samples 1018B. Video encoder 200 and video decoder 300 may combine the first set of samples 1018A and the third set of samples based on the weighting to generate reference template 1022.

With reference template 1022, video encoder 200 and video decoder 300 may determine a cost associated with the split mode that defined edge 1008. For example, video encoder 200 and video decoder 300 may compare (e.g., determine a sum of absolute differences (SAD) or some other calculation) reference template 1022 and current template 1004, which includes samples above and left of current block 1000, as illustrated in FIG. 10A. Video encoder 200 and video decoder 300 may determine the cost of the split mode that defines edge 1008 based on the comparison (e.g., SAD value).

Accordingly, FIGS. 10A-10D illustrate example operations that video encoder 200 and video decoder 300 may perform to determine the cost associated with a first split mode (e.g., the split mode that defines edge 1008). Video encoder 200 and video decoder 300 may repeat such operations for all or a subset of the plurality of split modes to determine respective costs for each of the split modes. As an example, the result of performing the example operation of FIGS. 10A-10D, video encoder 200 and video decoder 300 may determine a cost X for split mode A, where A is a value indicative of the split mode, a cost Y for split mode B, where B is a value indicative of the split mode, and so forth.

Video encoder 200 and video decoder 300 may construct the mapping list based on the respective costs. For instance, assume that cost Y is less than cost X. In this example, video encoder 200 and video decoder 300 may include the split mode B (e.g., value indicative of split mode B) before split mode A (e.g., value indicative of split mode A). In this example, the value for A and B (e.g., for split mode A and split mode B) may be examples of split mode indices. For instance, the value for A may be one of the values in table 1, and the value for B may be another one of the values in table 1. Based on a value from the mapping list, video decoder 300 may determine a split mode of the plurality of split modes.

For example, assume that split mode B is located at index 2 (e.g., third entry) in the mapping list. In this example, if video decoder 300 receives an index of 2, video decoder 300 may determine the split mode is split mode B. Video decoder 300 may then use the value of "B" as a split mode index into table 1, and determine the angle and offset for the edge defined by split mode B. Video decoder 300 may then partition a current block (e.g., like current block 1000) based on the edge defined by split mode B and reconstruct current block 1000 based on partitions 1002A, 1002B.

Figure 11:
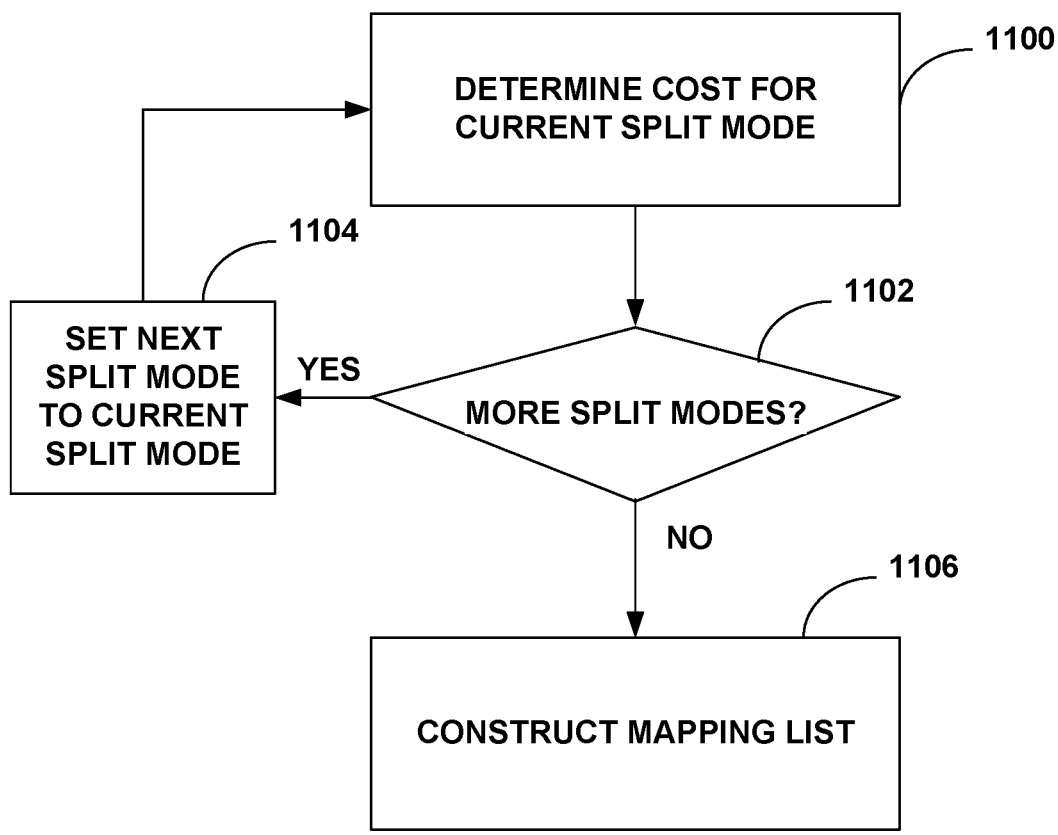
FIG. 11 is a flowchart illustrating an example of constructing mapping list for split modes.

FIG. 11 is a flowchart illustrating an example of constructing mapping list for split modes. In the example of FIG. 11, video encoder 200 and video decoder 300 may determine a cost for a current split mode (1100). For instance, video encoder 200 and video decoder 300 may perform the example operations described above with respect to FIGS. 10A-10D to determine a cost for a current split mode. For example, video encoder 200 and video decoder 300 may determine a reference template, like reference template 1022, based on the current split mode (e.g., based on the edge, like edge 1008, of the current split mode). Video encoder 200 and video decoder 300 may determine current template (e.g., current template 1004), and determine the cost associated with the current split mode based on the reference template and the current template.

Video encoder 200 and video decoder 300 may determine whether there are more split modes (1102). For instance, there may be 64 split modes, and video encoder 200 and video decoder 300 may determine whether video encoder 200 and video decoder 300 have determined a cost for each of the 64 split modes. In some examples, rather than all 64 split modes, a subset of split modes may be considered.

If there are more split modes for which costs have not yet been determined (YES of 1102), video encoder 200 and video decoder 300 may set the next split mode as the current split mode (1104). Video encoder 200 and video decoder 300 may determine the cost for the current split mode (1100), and repeat such operations until there are no more split modes.

In this manner, for each split mode among at least two of the plurality of split modes, video encoder 200 and video decoder 300 may determine a respective cost associated with a respective split mode. For instance, each cycle through operations of (1100) and (1104) corresponds to a determination of a respective cost associated with a respective split mode of the plurality of split modes. As one example, during a first pass through the operations of (1100) and (1104), video encoder 200 and video decoder 300 may determine a first reference template (e.g., like reference template 1022) based on a first split mode, and determine a first cost based on the first reference template and the current template 1004. During a second pass through the operations of (1100) and (1104), video encoder 200 and video decoder 300 may determine a second reference template (e.g., like reference template 1022) based on a second split mode, and determine a second cost based on the second reference template and the current template 1004, and so forth.

If there are no more split modes for which costs have not yet been determined (NO of 1102), video encoder 200 and video decoder 300 may construct a mapping list (1106). In the example of FIG. 11, the construction of the mapping list is illustrated as occurring after the determination of the respective costs. However, the example techniques are not so limited, and video encoder 200 and video decoder 300 may construct the mapping list as part of determining costs (e.g., by continuously reordering the list based on each new determined cost).

To construct the mapping list, video encoder 200 and video decoder 300 may order one or more of the split modes in ascending order based on the respective costs. For instance, video encoder 200 and video decoder 300 may form the mapping list such that the first entry (e.g., index value 0) in the mapping list includes the value indicative of the split mode having the lowest cost, the second entry (e.g., index value 1) in the mapping list includes the value indicative of the split mode having the next lowest cost, and so forth. In this way, video encoder 200 and video decoder 300 may construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list.

In some examples, video encoder 200 and video decoder 300 may keep adding values indicative of respective costs until there are N values. In other words, to construct the mapping list, video encoder 200 and video decoder 300 may include N split modes having the lowest costs. As one example, N equals 32.

As described above, video encoder 200 and video decoder 300 may determine the cost based on a respective reference template (e.g., such as reference template 1022) and current template 1004. The following describes examples for the cost calculation. For ease, the following is described with respect to reference template 1022, with the understanding that similar operations may be performed for the respective reference templates for the respective split modes.

In one example, such as described with respect to FIG. 10D, reference template 1022 may include samples from first set of samples 1018A of first reference template 1014A, and third set of samples 1020B of second reference template 1014B. Then, the cost is derived based on the difference between current template 1004 and the respective reference block templates.

However, as also described above, in one example, the reference block templates are blended first using GEO weights. That is, samples from first set of samples 1018A and third set of samples 1020B that are proximate to line 1016 are blending using the weights defined for geometric partition mode. Then, the cost is derived based on the difference between current template 1004 and the respective blended reference block templates.

The cost (e.g., difference metrics) can be SAD, SATD, SSE, Mean-removed SAD, Mean-removed SATD, or Mean-removed SSE. This can be formulated as follows:

$$\sum (i, j) \in T | C(i, j) - \text{Clip}$$

$$((w_0(i, j) ** P_0(vx_0 + i, vy_0 + j) + w_1(i, j) * P_1(vx_1 + i, vy_1 + j) + o) >> s)|,$$

In the above, T={(0, −t), (block width minus 1, −t), (−t, 0), . . . , (−t, block height minus 1)|∀∀t=1, . . . , maximum template size}, C(i,j) denotes the reconstructed intensity value of a sample located at (i,j) relative to the top-left sample of the current block, $P_n$ ($vx_n+i, vy_n+j$) denotes the intensity value of a sample located at (i, j) relative to the top-left sample of a reference block pointed to by the motion vector ($vx_n$, $vy_n$) and $P_0$ and $P_1$ are generated using the same subclause 8.5.7.1 in the VVC spec JVET-T2001 as for predSamplesLA$_L$ and predSamplesLB$_L$ with a different array size (that is the aforementioned T), $W_n$ (i,j) is the value of a GEO weight (as described above for usage of GEO weights for blending reference block templates) that is corresponding to and applied to the sample $P_n$ ($vx_n+i, vy_n+j$) and $w_1(i,j)=8-w_0(i,j)$, t ranges from 1 to a certain positive number determined by the maximum size of template, s and o are defined respectively as shift1 and offset1 which are the same as the respective equations (992) and (993) in the VVC spec JVET-T2001, and Clip is a function to clip input value within 0 and $2^{[<]BEGINITALmBitDepth}-1$, inclusive.

In one example, the difference block templates are generated first. The difference block templates (i.e., one for top template and the other for left template) are the delta difference between the current block templates and the reference block templates. Since GEO has two partitions, there are two sets of difference block templates (e.g., one set for a partition and the other set for the other partition).

Stated another way, in some examples, video encoder 200 and video decoder 300 may determine a difference between current template 1004 and first reference template 1014A, and determine a difference between current template 1004 and second reference template 1014B. Video encoder 200 and video decoder 300 may then perform the blending.

Then, the blending process is applied to blend the two sets of difference block templates and then the TM cost is the sum of all values on the blended difference block templates. This can be formulated as follows:

$$\sum\nolimits_{(i,j)\varepsilon T} w_0(i, j)^* |C(i, j) - \text{Clip}((P_0(vx_0 + i, vy_0 + j) + o) \gg s)| +$$

$$w_1(i, j) * |C(i, j) - \text{Clip}((P_1(vx_1 + i, vy_1 + j) + o) \gg s)|,$$

In the above, $P_0$ and $P_1$ are generated as if they are two uni-pred templates and thus their bit-depth is identical to that of the current template C and their o and s are specified as s=Max(2, 14-bitDepth) and o=1<<(s−1).

In another example, for simplification purpose, the reference block templates are interpolated toward a pre-defined bit-depth (e.g., 8 bits, 10 bits, 12 bits, 14 bits or higher ones) and the current block templates are also shifted in order to match the pre-defined bit-depth. Then, the TM cost is computed at the pre-defined bit-depth. To achieve this, the respective settings of bit-depth used in the aforementioned examples for s and o have to be set equal to the pre-defined bit-depth and C(i,j) may be shifted toward left or right depending whichever of the original bit-depth and the pre-defined bit-depth is larger. For example, C(i,j) is shifted toward left by 2 bits if the pre-defined bi-depth is larger than the original one by 2.

For simplification purpose, TM cost considers only partial of the samples on templates, instead of full samples.

a. In one example, samples located on top templates are not considered.

b. In another example, samples located on left templates are not considered c. In another example, each sample with an odd (or even) row index on both left and top templates is not considered in TM cost calculation. Alternatively, in yet another example, the subsampling rule is applied to left template. Alternatively, in yet another example, the subsampling rule is applied to top template.

d. In another example, each sample with an odd (or even) column index on both left and top templates is not considered in TM cost calculation. Alternatively, in yet another example, the subsampling rule is applied to left template. Alternatively, in yet another example, the subsampling rule is applied to top template.

The following describes usage of GEO weights for blending reference block templates. This disclosure describes a variety of methods to derive the weight values that are used in the blending process of reference block templates.

In one example, the weight values associated with the sample positions outside the current block are also computed by using the same equations that VVC GEO uses to derived weight values. That is, when performing blending of one or more samples of first set of samples 1018A of first reference template 1014A and one or more samples of third set of samples 1020B of second reference template 1014B that are proximate to line 1016C, video encoder 200 and video decoder 300 may use the sample equations of VVC for the weighting.

Specifically, this modification requires adding another configurations for equations (1002)-(1007) in the VVC spec JVET-T2001. The bolded, italicised portions within <ADD> . . . </ADD> below indicate the difference between this example and equations (1002)-(1007).

<ADD> The prediction samples of top reference template block pbSamples [x][y] with x=0 . . . nCbW−1 and y=−1 and the prediction samples of left reference template block pbSamples [x][y] with x=−1 and y=0 . . . nCbH−1 are derived as follows: </ADD>

The variables xL and yL are derived as follows:

$$xL = (cIdx == 0)?x:x*SubWidthC$$

$$yL = (cIdx == 0)?y:y*SubHeightC$$

The variable wValue specifying the weight of the prediction sample is derived based on the array disLut specified in Table 37 of JVET-T2001 as follows:

$$weightIdx = (((xL + offsetX) \ll 1) + 1)*disLut[displacementX] +$$
$$(((yL + offsetY) \ll 1) + 1)*disLut[displacementY]$$
$$weightIdxL = partFlip?32 + weightIdx : 32 - weightIdx$$
$$wValue = \text{Clip3}(0, 8, (weightIdxL + 4) \gg 3)$$

The prediction sample values are derived as follows:

$$pbSamples[x][y] =$$
$$\text{Clip3}(0, (1 \ll BitDepth) - 1, (predSamplesLA[x][y]*wValue +$$
$$predSamplesLB[x][y]*(8 - wValue) + offset1) \gg shift1)$$

TABLE 37 of JVET-T2001 - Specification of the geometric partitioning distance array disLut.

| idx | 0 | 2 | 3 | 4 | 5 | 6 | 8 | 10 | 11 | 12 | 13 | 14 |
|---|---|---|---|---|---|---|---|---|---|---|---|---|
| disLut[ idx ] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[ idx ] | −8 | −8 | −8 | −4 | −4 | −2 | 0 | 2 | 4 | 4 | 8 | 8 |

In one example, for simplification purpose, the weight values associated with the boundary samples inside the current block are re-used. Thus, there is no extra complexity to derive the weight values for blending reference block templates. For example, when the template size is of 1 line, then the weight values applied to the first row of the block are applied directly to the top reference block template, while the weight values applied to the first left column of the block are applied directly to the left reference block template. For another example, when the template size is more than 1 lines, each line of the top reference template block shares the same weight values as those of the first top row inside the current block. Similarly, each line of the left reference template block shares the same weight values as those of the first left column inside the current block. The bolded, italicised portions within <ADD> . . . </ADD> parts below indicate the difference between this example and equations (1002)-(1007).

<ADD. The prediction samples of top reference template block pbSamples [x][y] with x=0 . . . nCbW−1 and y=−1 and the prediction samples of left reference template block pbSamples [x][y] with x=−1 and y=0 . . . nCbH−1 are derived as follows: </ADD>

The variables xL and yL are derived as follows:

$$\langle ADD \rangle xD = (\text{is top reference block}?x:0)$$
$$yD = (\text{is top reference block}?0:y)\langle /ADD \rangle$$
$$xL = (cIdx == 0)?\langle ADD \rangle xD{:}xD\langle /ADD \rangle * SubWidthC$$
$$yL = (cIdx == 0)?\langle ADD \rangle yD{:}yD\langle /ADD \rangle * SubHeightC$$

The variable wValue specifying the weight of the prediction sample is derived based on the array disLut specified in Table 37 of JVET-T2001 as follows:

$$weightIdx = (((xL + offsetX) \ll 1) + 1)*disLut[displacementX] +$$
$$(((yL + offsetY) \ll 1) + 1)*disLut[displacementY]$$
$$weightIdxL = partFlip?32 + weightIdx : 32 - weightIdx$$
$$wValue = \text{Clip3}(0, 8, (weightIdxL + 4) \gg 3)$$

The prediction sample values are derived as follows:

$$pbSamples[x][y] =$$
$$\text{Clip3}(0, (1 \ll BitDepth) - 1, (predSamplesLA[x][y]*wValue +$$
$$predSamplesLB[x][y]*(8 - wValue) + offset1) \gg shift1)$$

In another example, for simplification purpose, the weight values used are only 0 and 8, which means there is no blending applied to the samples along the GEO splitting edges. For instance, when no weighting is applied, reference template 1022 includes samples of first set of samples 1018A of first reference template 1014A, and samples of third set of samples 1020B of second reference template 1014B without blending the samples with one another. Each sample on the reference template 1022 is simply chosen from the reference template of either the first GEO partition or the other GEO partition (e.g., from either first reference template 1014A or second reference template 1014B), and thus multiplication used in the blending process can be avoided completely. Specifically, this modification requires adding another configurations for equations (1002)-(1007) in the VVC spec JVET-T2001. The bolded, italicised portions within <ADD> . . . </ADD> parts below indicate the difference between this example and equations (1002)-(1007).

<ADD> The prediction samples of top reference template block pbSamples [x][y] with x=0 . . . nCbW−1 and y=−1 and the prediction samples of left reference template block pbSamples [x][y] with x=−1 and y=0 . . . nCbH−1 are derived as follows: </ADD>

The variables xL and yL are derived as follows:

$$xL = (cIdx == 0)?x:x*SubWidthC$$

$$yL = (cIdx == 0)?y:y*SubHeightC$$

The variable wValue specifying the weight of the prediction sample is derived based on the array disLut specified in Table 37 as follows:

$$weightIdx = (((xL + offsetX) \ll 1) + 1)*disLut[displacementX] +$$

$$(((yL + offsetY) \ll 1) + 1)*disLut[displacementY]$$

$$\langle ADD \rangle wValue =$$

$$partFlip?(weightIdx > 0?8:0):(weightIdx > 0?0:8)\langle/ADD\rangle$$

The prediction sample values are derived as follows:

$$pbSamples[x][y] =$$

$$Clip3(0, (1 \ll BitDepth) - 1, (predSamplesLA[x][y]*wValue +$$

$$predSamplesLB[x][y]*(8 - wValue) + offset1) \gg shift1)$$

Another example is a combination of above examples. <ADD> The prediction samples of top reference template block pbSamples [x][y] with x=0 . . . nCbW−1 and y=−1 and the prediction samples of left reference template block pbSamples [x][y] with x=−1 and y=0 . . . nCbH−1 are derived as follows: </ADD>
The variables xL and yL are derived as follows:

$$\langle ADD \rangle xD = \text{(is top reference block?} x : 0)$$

$$yD = \text{(is top reference block?} 0 : y)\langle/ADD\rangle$$

$$xL = (cIdx == 0)?\langle ADD \rangle xD:xD\langle/ADD\rangle*SubWidthC$$

$$yL = (cIdx == 0)?\langle ADD \rangle yD:yD\langle/ADD\rangle*SubHeightC$$

The variable wValue specifying the weight of the prediction sample is derived based on the array disLut specified in Table 37 as follows:

$$weightIdx = (((xL + offsetX) \ll 1) + 1)*disLut[displacementX] +$$

$$(((yL + offsetY) \ll 1) + 1)*disLut[displacementY]$$

$$\langle ADD \rangle wValue =$$

$$partFlip?(weightIdx > 0?8:0):(weightIdx > 0?0:8)\langle/ADD\rangle$$

The prediction sample values are derived as follows:

$$pbSamples[x][y] =$$

$$Clip3(0, (1 \ll BitDepth) - 1, (predSamplesLA[x][y]*wValue +$$

$$predSamplesLB[x][y]*(8 - wValue) + offset1) \gg shift1)$$

In another example, as a simplification method of the above techniques, the value of wValue can be further updated after the equation "wValue=Clip3(0, 8, (weightIdxL+4)>>3)" is processed. Specifically, the updating operation could be either "wValue=wValue<4?0:8" or "wValue=wValue≤4?0:8".

The following describes application to GEO+TM mode. In one example, the split mode coding methods described in syntax reordering for GEO split modes using grouping and TM cost based syntax reordering for GEO split modes can be applied to GEO+TM, where the used motion information of the two GEO partitions is unrefined. The unrefined motion information is used to generate the reference block templates for TM cost calculation.

In one example, the split mode coding methods described in syntax reordering for GEO split modes using grouping and TM cost based syntax reordering for GEO split modes can be applied to GEO+TM, where the used motion information of the two GEO partitions is refined. The refined motion information is used to generate the reference block templates for TM cost calculation.

The following describes interaction between reference picture resampling (RPR) and TM-cost based GEO split mode reordering. Some of the example techniques may be related to U.S. Provisional Application No. 63/265,555, filed Dec. 16, 2021, the contents of which are incorporated herein by reference. The examples listed below disclose RPR restrictions on template matching (TM) prediction to determine whether TM can be applied or not based on the respective picture sizes of the current picture and the reference picture(s).

In one example, the GEO splitting modes are no longer reordered based on TM cost when a reference picture size is different from the current one. Rather, a default order (e.g., from smaller splitting mode index to large one) is assigned for all candidates of GEO, GEO+MMVD and GEO+TM modes.

In another example, the GEO splitting modes are no longer reordered based on TM cost when a reference picture is applied with WP. Rather, a default order (e.g., from smaller splitting mode index to large one) is assigned for all candidates of GEO, GEO+MMVD and GEO+TM modes.

The following describes extensions. Similar concepts described above with respect to TM cost based syntax reordering for GEO split modes can be utilized to improve the coding performance of candidate indices of GEO, GEO+MMVD, GEO+TM modes. The concept of reordering is applied to GEO candidates, instead of GEO split modes, in the following example.

For GEO, GEO+MMVD and GEO+TM modes, they all require signaling a pair of merge indices to indicate the use of merge candidates for both GEO partitions. In this example, for each pair of merge indices, GEO generates reference block templates for both partitions in order to calculate TM cost. The way that TM cost is computed (as described above with respect to TM cost calculation) and weight usage of template blocks (as described above with respect to usage of GEO weights for blending reference block templates) can be combined with this example. Then, the TM cost is used to sort all the pairs in ascending order and a reordering index can be assigned accordingly. Then, same as TM cost based syntax reordering for GEO split modes, this reordering index can be coded by using fixed-length binary code or Golomb-Rice code with a divisor D (with respect to Golomb-Rice described above), where D can be 1, 2, 4, . . . , M. In some examples, D is equal to 4.

In another example, as an extension to the above example, only the best N candidates which achieves lower TM cost than others are identified (while others are removed) and signaled by using fixed-length binary code (if N is power-of 2), truncated binary code (if N is non-power-of-2), or Golomb-Rice code with a divisor D (with respect to Golomb-Rice described above), where D can be 1, 2, 4, . . . , M.

For GEO+MMVD, there are multiple choices of offsets (terms as MVD offsets) that can be added to either one or both of the selected merge candidates. In ECM, there are 73 options (including zero MVD offset) for each of the GEO partitions. Thus, there are in total 5329 (=73×73) modes to be signaled. In this example, the respective TM costs of the 5329 modes are computed and the best N of them is identified for signalling. The signaling method can be fixed-length binary code (if N is power-of 2), truncated binary code (if N is non-power-of-2), or Golomb-Rice code with a divisor D (with respect to Golomb-Rice described above), where D can be 1, 2, 4, . . . , M.

In another example on top of the previous one, the zero MVD offset is excluded from sorting and thus there are only 72×72 modes involved in the sorting process. Instead of sorting all possible combinations of GEO candidates, the below example includes sorting the candidates of a GEO partition independently.

For GEO, GEO+MMVD and GEO+TM modes, they all require signaling a pair of merge indices to indicate the use of merge candidates for both GEO partitions. Supposing there are N candidates per GEO partition, the respective TM costs are computed for these N candidates. Then, the best N of them is identified for signalling. The signaling method can be fixed-length binary code (if N is power-of 2), truncated binary code (if N is non-power-of-2), or Golomb-Rice code with a divisor D (with respect to Golomb-Rice described above), where D can be 1, 2, 4, . . . , M. There are two different ways to compute the TM cost, as follows:

a. The TM cost is the sum of absolute difference between the reference block templates of a GEO partition and the current block templates. The subsampling TM cost as disclosed above for the TM cost calculation can be combined together. It can be formulated as follows:

$$\sum_{(i,j)\in T} |C(i, j) - \text{Clip}((P(vx + i, vy + j) + o) \gg s)|,$$

where T={(0, −t), (block width minus 1, −t), (−t, 0), . . . , (−t, block height minus 1)|∀=1, . . . , maximum template size}, C(i,j) denotes the reconstructed intensity value of a sample located at (i,j) relative to the top-left sample of the current block, P(vx+i,vy+j) denotes the intensity value of a sample located at (i, j) relative to the top-left sample of a reference block pointed to by the motion vector (vx, vy) and P is generated as if it is a uni-pred template and thus its bit-depth is identical to that of the current template C (and thus s=Max(2, 14-bitDepth) and o=1<<(s−1)), and t ranges from 1 to a certain positive number determined by the maximum size of template b. The TM cost is the sum of weighted absolution difference between the reference block templates of a GEO partition and the current block templates. It can be formulated as follows:

$$\sum_{(i,j)\in T} w(i, j) * |C(i, j) - \text{Clip}((P(vx + i, vy + j) + o) \gg s)|,$$

where w (i,j) is the value of a GEO weight that is corresponding to the sample located at (i,j) on the current block templates.

As noted above, for GEO+MMVD, there are multiple choices of offsets (terms as MVD offsets) that can be added to either one or both of the selected merge candidates. Supposing there are N MVD offsets (either including of excluding zero MVD offset) per GEO partition, the respective TM cost is computed for these N candidates. Then, the best N of them is identified for signalling. The signaling method can be fixed-length binary code (if N is power-of 2), truncated binary code (if N is non-power-of-2), or Golomb-Rice code with a divisor D (with respect to Golomb-Rice described above), where D can be 1, 2, 4, . . . , M. There are also two different ways to compute the TM cost which is identical to what the previous example describes.

Figure 2:
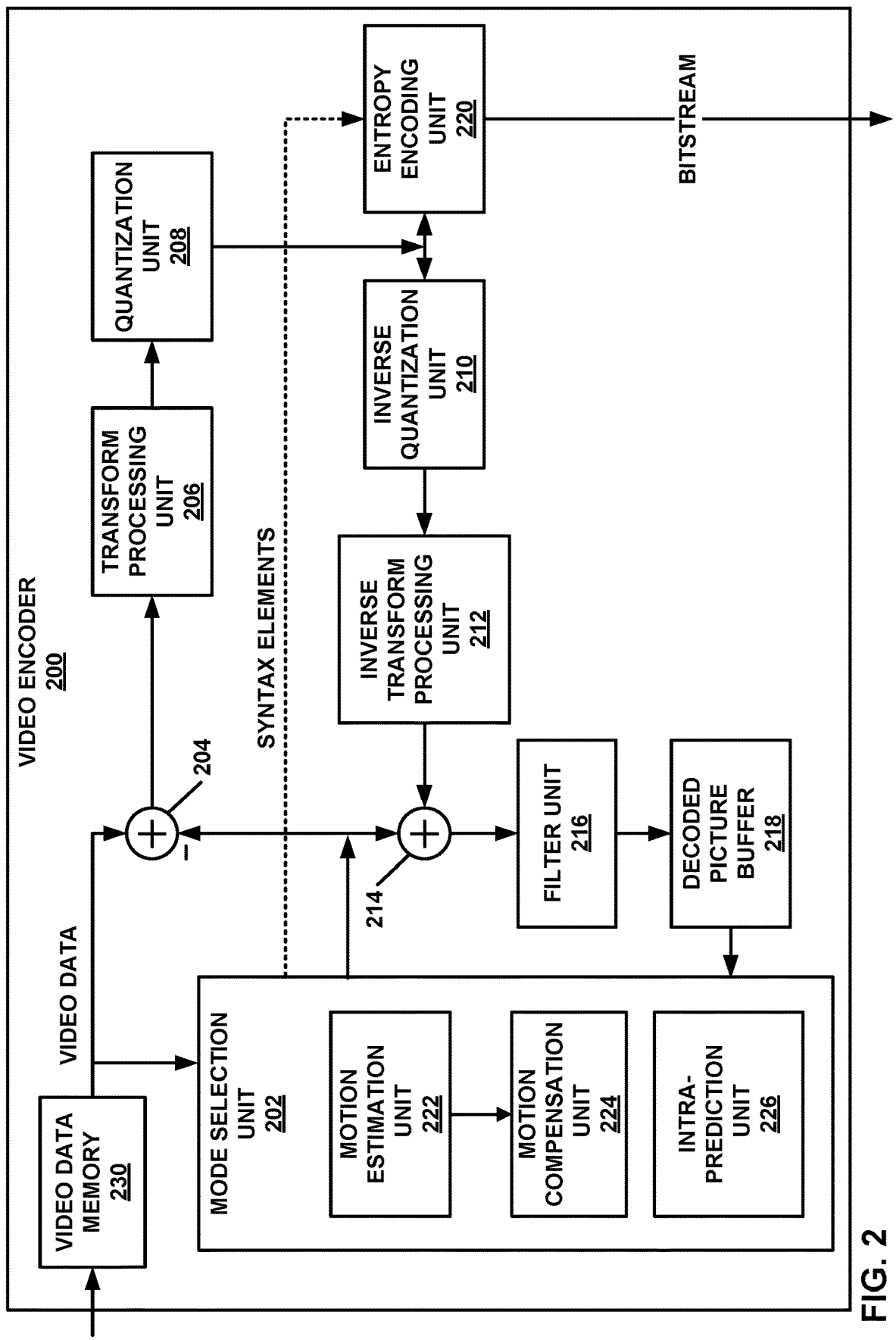
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUS, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to access from memory a mapping table in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M. Video encoder 200 may be configured to determine a split mode of the plurality of split modes from the mapping table, and signaling an index into the mapping table indicative of the split mode for decoding a current block of the video data.

In some examples, video encoder 200 may be configured to determine a cost associated with one or more split modes of geometric partition mode (GEO), wherein there are M split modes of GEO, construct a mapping table (e.g., mapping list) having index values indicative of the respective split modes based on the respective cost for the one or more split modes of GEO, determine a split mode of the plurality of split modes based on the mapping table, and signal an index into the mapping table indicative of the split mode for decoding a current block of the video data.

Figure 3:
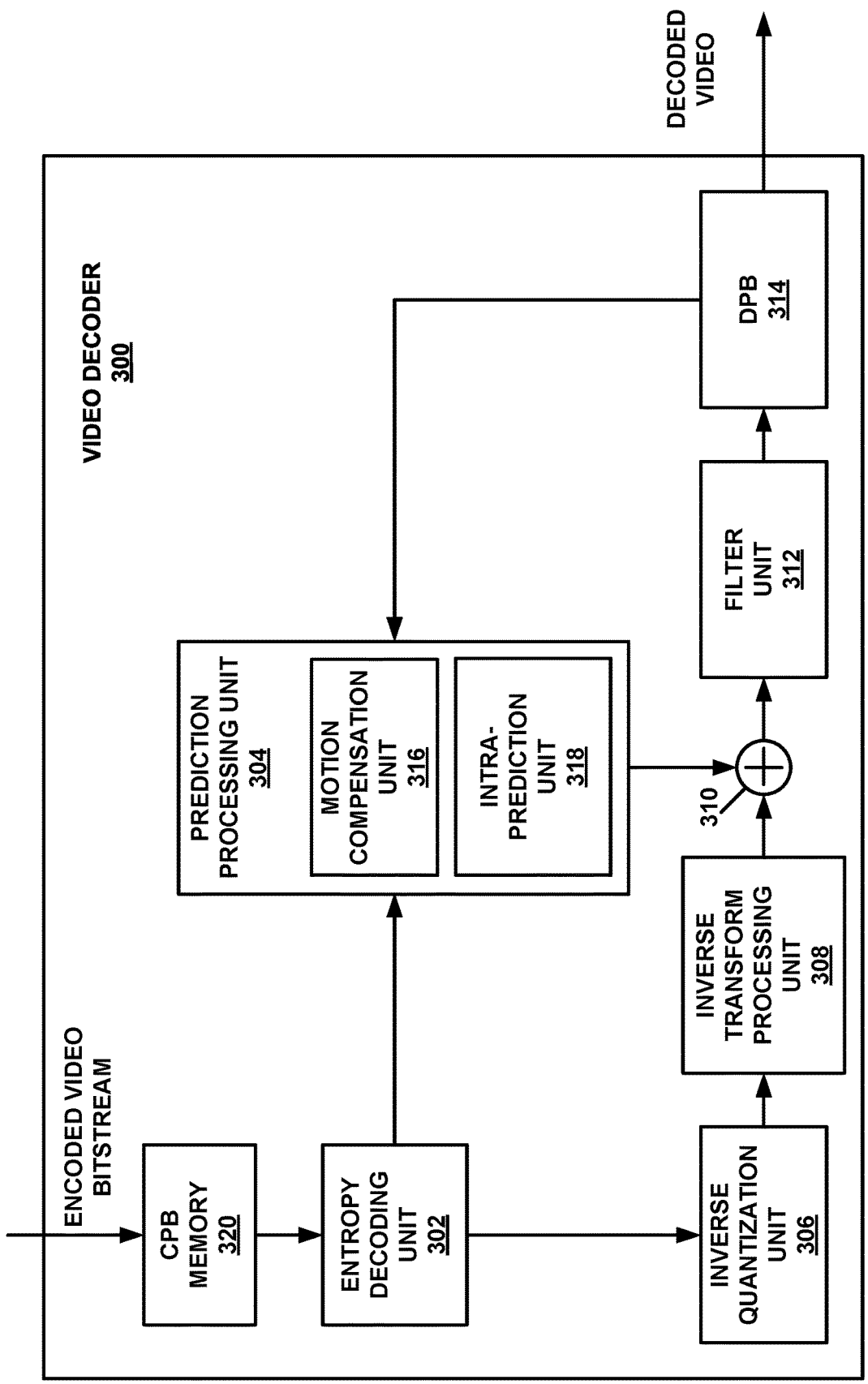
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to access from memory a mapping table in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M. Video decoder 300 may be configured to determine a split mode of the plurality of split modes from the mapping table, and reconstruct a current block of the video data based on the split mode (e.g., determined split mode).

In some examples, video decoder 300 may be configured to determine a cost associated with one or more split modes of geometric partition mode (GEO), wherein there are M split modes of GEO, construct a mapping table (e.g., mapping list) having index values indicative of the respective split modes based on the respective TM cost for the one or more split modes of GEO, determine a split mode of the plurality of split modes based on the mapping table, and reconstruct a current block of the video data based on the split mode (e.g., determined split mode).

Figure 12:
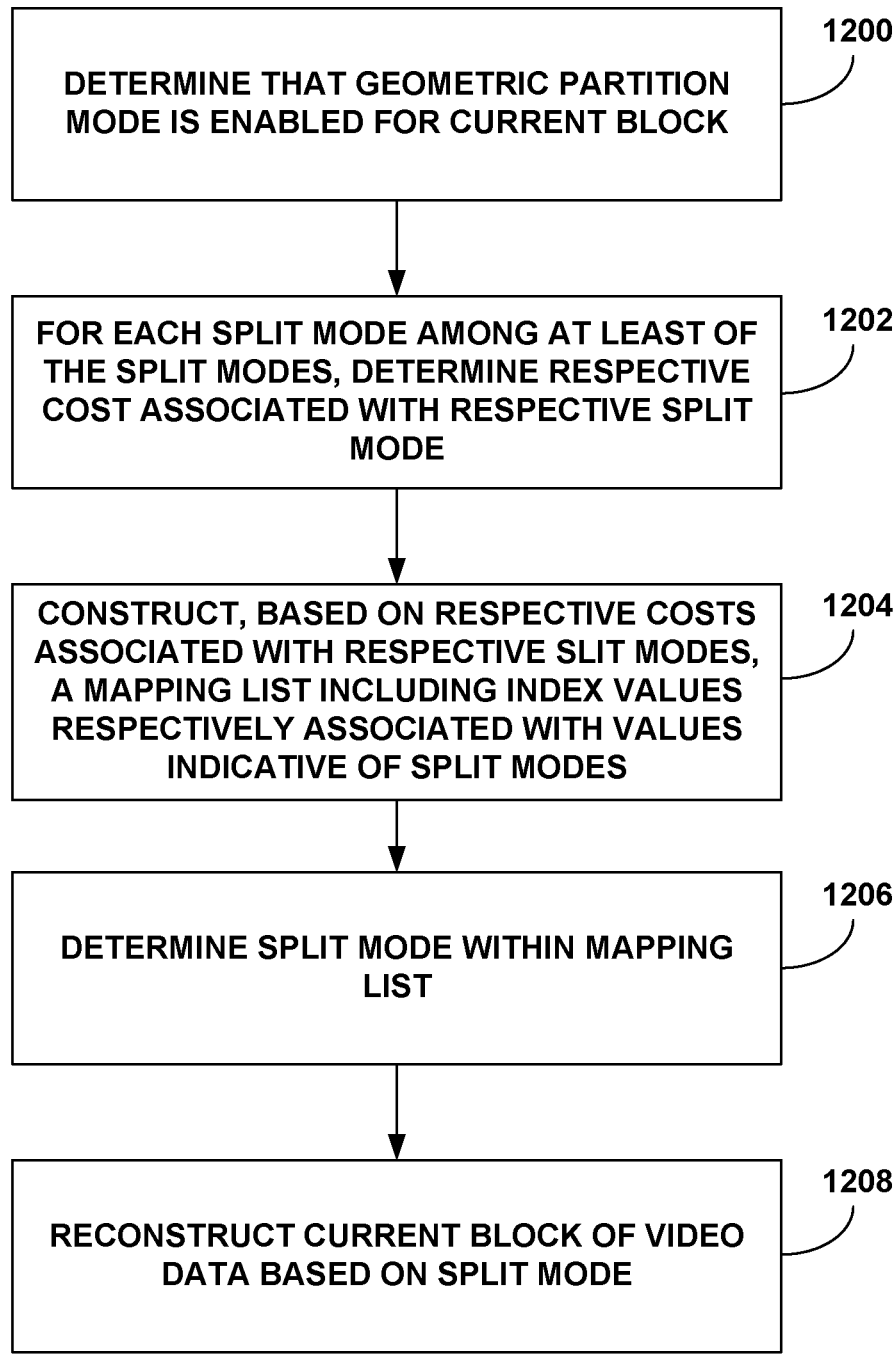
FIG. 12 is a flowchart illustrating an example method of decoding in accordance with example techniques described in this disclosure.

FIG. 12 is a flowchart illustrating an example method of decoding in accordance with example techniques described in this disclosure. The example techniques are described with respect to memory, examples of which include memory 120, CPB memory 320, DPB 314, or other memory accessible by video decoder 300. The example techniques are also described with respect to processing circuitry, examples of which include video decoder 300 or units of video decoder 300 such as prediction processing unit 304, motion compensation unit 316, or some other unit of video decoder 300. Also, for ease of description, reference is made to FIGS. 6, 10A-10D, and FIG. 11. For instance, the memory may be configured to store video data of current block 1000. The processing circuitry coupled to the memory may be configured to perform the example techniques of FIG. 12.

As one example, the processing circuitry may determine that that geometric partition mode is enabled for a current block 1000 of the video data (1200). For instance, the processing circuitry may receive one or more syntax elements from the bitstream encoded by video encoder 200 that defines the coding mode, and includes information that the coding mode is the geometric partition mode. The processing circuitry may determine that the partition mode is enabled for current block 1000 based on the received one or more syntax elements. Examples of the geometric partition mode include GEO, GEO+MMVD and GEO+TM modes. The term GEO is used interchangeably with GPM (geometric partition mode).

The geometric partition mode includes a plurality of split modes that each define an edge for partitioning. For instance, FIG. 6 illustrates examples of different split modes that each defines a respective edge that is used to partition a block into two partitions.

For each split mode among at least two of the plurality of split modes (e.g., subset or all of the split modes), the processing circuitry may be configured to determine a respective cost associated with a respective split mode (1202). For instance, the processing circuitry may repeatedly perform the operations of determining a cost for a current (e.g., respective) split mode (1100) of FIG. 11, setting the next split mode to the current split mode (1104) of FIG. 11 until there are no more split modes to evaluate (NO of 1102) of FIG. 11. The number of split modes that are evaluated may be all available split modes, or a subset of the available split modes.

As one example, to determine the respective cost associated with the respective split mode, the processing circuitry may be configured to determine the respective reference template based on the respective split mode of the plurality of split modes, determine a current template 1004, as shown in FIG. 10A, for the current block 1000. As described, the current template 1004 includes samples external to the current block 1000, such as samples from above portion 1006A and left portion 1006B, as shown in FIG. 10A. The processing circuitry may determine the respective cost associated with the respective split mode based on the respective reference template and the current template 1004.

As described above, the processing circuitry may be configured to determine respective reference template. One example the respective reference template is reference template 1022 of FIG. 10D. In some examples, to determine the respective reference template, the processing circuitry may be configured to determine a first reference template 1014A based on a first reference block 1010A of FIGS. 10B and 10C identified by a first motion vector 1012A of FIG. 10B of a first partition 1002A of FIGS. 10A and 10B of the current block 1000. The processing circuitry may be configured to determine a second reference template 1014B based on a second reference block 1010B of FIGS. 10B and 10C identified by a second motion vector 1012B of FIG. 10B of a second partition 1002B of FIGS. 10A and 10B of the current block 1000.

The first reference template 1014A includes a first portion of samples above the first reference block 1010A and a second portion of samples left of the first reference block 1010A. The second reference template 1014B includes a first portion of samples above the second reference block 1010B and a second portion of samples left of the second reference block 1010B.

The processing circuitry may be configured to combine samples from the first reference template 1014A and the second reference template 1014B based on the respective split mode to generate the respective reference template, such as reference template 1022. That is, each of the respective split modes may define which samples are used from first reference template 1014A and second reference template 1014B, and the processing circuitry may then combine the samples, possibly with blending but without blending is possible as well.

As one example, to combine samples from the first reference template 1014A and the second reference template 1014B based on the respective split mode to generate the respective reference template, the processing circuitry may be configured to apply the respective split mode to the first reference block 1010A. For instance, as illustrated in FIG. 10C, the processing circuitry may apply the split mode, which is one of the split modes, that defines edge 1008 to first reference block 1010A.

The processing circuitry may extend the applied respective split mode to samples of the first reference template

1014A. For instance, as illustrated in FIG. 10C, the processing circuitry may extend edge 1008 to form line 1016A that extends into samples of first reference template 1014A, and partitions first reference template 1014A into a first portion that includes first set of samples 1018A and a second portion that includes second set of samples 1018B.

The processing circuitry may access first set of samples 1018A in the first reference template 1014A based on the extension of the applied respective split modes to the samples of the first reference template 1014A. For instance, as illustrated in FIG. 10C, the processing circuitry may access one or more samples in first set of samples 1018A. The first reference block 1010A is based on first partition 1002A, and first partition 1002A is located in the same direction relative to edge 1008 that the portion that includes first set of samples 1018A is located relative to line 1016A. Therefore, the first set of samples 1018A in the first reference template 1014A may be one or more, including all, samples of the first portion.

As illustrated in FIG. 10C, the processing circuitry may similarly apply respective split modes to the second reference block 1010B. For example, the processing circuitry may apply the split mode, which is one of the split modes, that defines edge 1008 to second reference block 1010B.

The processing circuitry may extend the applied respective split modes to samples of the second reference template 1014B. For instance, as illustrated in FIG. 10C, the processing circuitry may extend edge 1008 to form line 1016B that extends into samples of second reference template 1014B, and partitions second reference template 1014B into a first portion that includes a fourth set of samples 1020A and a second portion that includes a third set of samples 1020B.

The processing circuitry may access respective third set of samples 1020B in the second reference template 1014B based on the extension of the applied respective split modes to the samples of the second reference template 1014B. For instance, as illustrated in FIG. 10C, the processing circuitry may access one or more samples in third set of samples 1020B. The second reference block 1010B is based on second partition 1002B, and second partition 1002B is located in the same direction relative to edge 1008 that the portion that includes third of samples 1020B is located relative to line 1016B. Therefore, the third set of samples 1020B in the second reference template 1014B may be one or more, including all, samples of the third set of samples 1020B.

The processing circuitry may combine the respective first set of samples 1018A and the respective third set of samples 1020B to generate the respective reference template 1022. For instance, as illustrated in FIG. 10D, the processing circuitry may combine the samples of first set of samples 1018A and third set of samples 1020B along line 1016C, which corresponds to lines 1016A, 1016B to generate reference template 1022. In some examples, the processing circuitry may blend one or more samples in the respective first set of samples 1018A and the fourth set of samples 1020A and blend one or more samples in the respective second set of samples 1020B and the second set of samples 1018B, and combine the respective first set of samples 1018A and the respective third set of samples 1020B based on the blending. However, such blending is not necessary in all examples.

Referring back to FIG. 12, the processing circuitry may construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list (1204). For instance, as described above with respect to FIG. 11, after determining the respective costs or along with determining the respective costs, the processing circuitry may construct the mapping list. As one example, the processing circuitry may order one or more of the split modes in ascending order based on the respective costs. In some examples, the processing circuitry may include N (e.g., 32) split modes having the lowest costs in the mapping list.

Also, as described above, the mapping list may include index values (e.g., index values in ascending order starting with 0). Each of the index values represents an entry in the mapping list, and each entry in the mapping list may store a value indicative of the split mode. For instance, index value 0 in the mapping list may refer to a first entry in the mapping list, and the first entry may store a first value indicative of a first split mode. Index value 1 in the mapping list may refer to a second entry in the mapping list, and the second entry may store a second value indicative of a second split mode, and so forth. Accordingly, the mapping list includes index values respectively associated with values indicative of the respective split modes.

In one or more examples, a lower index value in the mapping list is associated with a first split mode having a lower cost than a second split mode with a higher index value in the mapping list. For instance, as described above, the first value indicative of the first split mode may be stored in the entry in the mapping list identified by index value 0, and the second value indicative of the second split mode may be stored in the entry in the mapping list identified by index value 1. In this example, a first cost of the first split mode is less than a second cost of the second split mode.

The mapping list includes values indicative of the split modes. The values indicative of the split modes may be split index values, such as values that form as an index into Table 1. For instance, assume that the first entry (e.g., index 0) in the mapping list includes the value of 10, and the second entry (e.g., index 1) in the mapping list includes the value of 5. In this example, the value of 10, stored in the first entry of the mapping list, refers to an edge having angle 4, offset 0, per table 1. The value of 5, stored in the second entry of the mapping list, refers to an edge having angle 2, offset 3, per table 1.

The processing circuitry may determine a split mode of the plurality of split modes within (e.g., based on) the mapping list (1206). As one example, the processing circuitry may receive an index value into the mapping list (e.g., based on information signaled by video encoder 200). In some examples, the processing circuitry may fixed-length binary decode information indicative of the index value, truncated binary decode information indicative of the index value, Golomb-Rice decode information indicative of the index value, or context-based adaptive coding (CABAC) decode one or more bins of information indicative of the index value.

For instance, in some examples, the processing circuitry may CABAC decode all bins of the information indicative of the index. In some examples, the processing circuitry may CABAC decode some of the bins of the information indicative of the index, and other bins may be bypass decoded. In some examples, leading bins may be CABAC decoded, and latter bins may be bypass decoded.

The processing circuitry may determine the split mode based on the index value into the mapping list. For instance, keeping with above example, assume that the index into the mapping list is index 0. In this example, the processing circuitry may determine that split mode value is split mode 10. The processing circuitry may use split mode 10 as an index into table 1, and per Table 1, determine that the edge to partition the current block 1000 is angle 4, offset 0.

The processing circuitry may reconstruct a current block 1000 of the video data based on the split mode (e.g., determined split mode) (1208). For example, the processing circuitry may partition current block 1000 in accordance with the edge defined by the determine split mode. For instance, the processing circuitry may partition current block 1000 into first partition 1002A and second partition 1002B.

The processing circuitry may determine a first set of prediction values for first partition 1002A of current block 1000 defined by the determine split mode. For instance, the first set of prediction values may be values in first reference block 1010A that are relative to edge 1008 in the same direction as first partition 1002A.

The processing circuitry may determine a second set of prediction values for second partition 1002B of current block 1000 defined by the determined split mode. For instance, the second set of prediction values may be values in second reference block 1010B that are relative to edge 1008 in the same direction as second partition 1002B.

The processing circuitry may also determine residual values for current block 1000. For instance, the processing circuitry may receive information indicative of the residual values, where the residual values are indicative of a difference between a prediction block and current block 1000.

The processing circuitry may reconstruct the current block 1000 based on the first set of prediction values, the second set of prediction values, and the residual values. For example, the processing circuitry may generate the prediction block based on the first set of prediction values and the second set of prediction values, including possibly blending one or more prediction values from the first set of prediction values and one or more prediction values from the second set of prediction values. The processing circuitry may add the prediction block and the residual values to reconstruct the current block.

Figure 13:
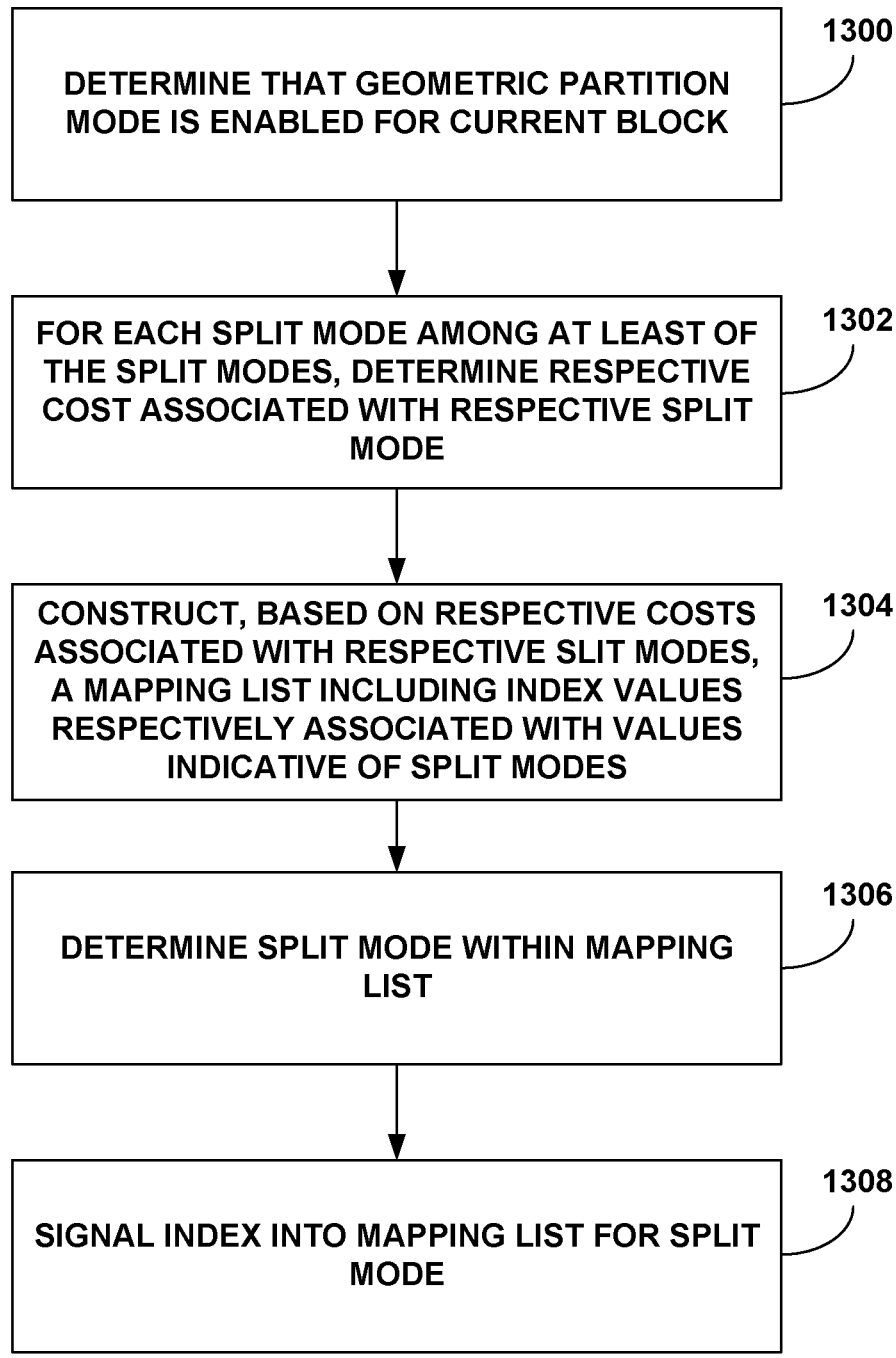
FIG. 13 is a flowchart illustrating an example method of encoding in accordance with example techniques described in this disclosure.

FIG. 13 is a flowchart illustrating an example method of encoding in accordance with example techniques described in this disclosure. The example techniques are described with respect to memory, examples of which include memory 106, video data memory 230, decoded picture buffer 218, or other memory accessible by video encoder 200. The example techniques are also described with respect to processing circuitry, examples of which include video encoder 200 or units of video encoder 200 such as mode selection unit 202, motion estimation unit 222, motion compensation unit 224, or some other unit of video encoder 200.

The processing circuitry may be configured to determine that geometric partition mode is enabled for current block 1000 (1300). For instance, the processing circuitry may attempt encoding current block 1000 using different coding modes, and determine that geometric partition mode is the coding mode that provides efficient coding. Examples of the geometric partition mode include GEO, GEO+MMVD and GEO+TM modes. The term GEO is used interchangeably with GPM (geometric partition mode).

For each split mode among at least two of the plurality of split modes (e.g., subset or all of the split modes), the processing circuitry may determine a respective cost associated with a respective split mode (1302), and construct a mapping list having values indicative of split modes based on respective costs associated with respective split modes (1304). For instance, the processing circuitry may perform similar operations to those described above in FIG. 12, but from the perspective of video encoder 200. For example, the processing circuitry constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list. In this manner, the mapping list constructed by video encoder 200 and the mapping list constructed by video decoder 300 are the same.

The processing circuitry may determine a split mode of the plurality of split modes that is included in the mapping list (1306). For instance, the processing circuitry may determine a particular split mode that provides the desired coding efficiency, and determine the location of the particular split mode in the mapping list. Based on the location of the particular split mode in the mapping list, the processing circuitry may determine an index for the mapping list.

The processing circuitry may signal the index into the mapping list for the split mode (e.g., determined split mode) (1308). For example, the processing circuitry may fixed-length binary encode information indicative of the index, truncated binary encode information indicative of the index, Golomb-Rice encode information indicative of the index, or context-based adaptive coding (CABAC) encode one or more bins of information indicative of the index.

The processing circuitry may also signal information indicative of residual values between a prediction block, generated based on the split mode, and current block 1000. Based on the index into the mapping list, video decoder 300 may generate the prediction block, and add the prediction block to the residual values to reconstruct current block 1000.

The example of FIGS. 12 and 13 may be considered as a method of encoding or decoding video data. For example, video encoder 200 and video decoder 300 may determine that geometric partition mode is enabled for a current block of the video data (1300 of FIG. 13, 1200 of FIG. 12). For each split mode among at least of the split modes, video encoder 200 and video decoder 300 may determine a respective cost associated with a respective split mode (1302 of FIG. 13, 1202 of FIG. 12). Video encoder 200 and video decoder 300 may construct a mapping list having values indicative of split modes based on respective costs associated with respective split modes (1304 of FIG. 13, 1204 of FIG. 12). Video encoder 200 and video decoder 300 may determine a split mode included in the mapping list (1306 of FIG. 13, and 1206 of FIG. 12).

In one or more examples, video encoder 200 and video decoder 300 may both be configured to reconstruct the current block based on the split mode. For instance, video decoder 300 may reconstruct the current block for display. Video encoder 200 may also reconstruct the current block as part of the feedback loop of inverse quantization unit 210, inverse transform processing unit 212, and reconstruction unit 214. In this way, FIGS. 12 and 13 illustrate a method of encoding or decoding video data. Video encoder 200 may also be configured to signal an index indicative of the split mode (e.g., an index into the mapping list).

Figure 14:
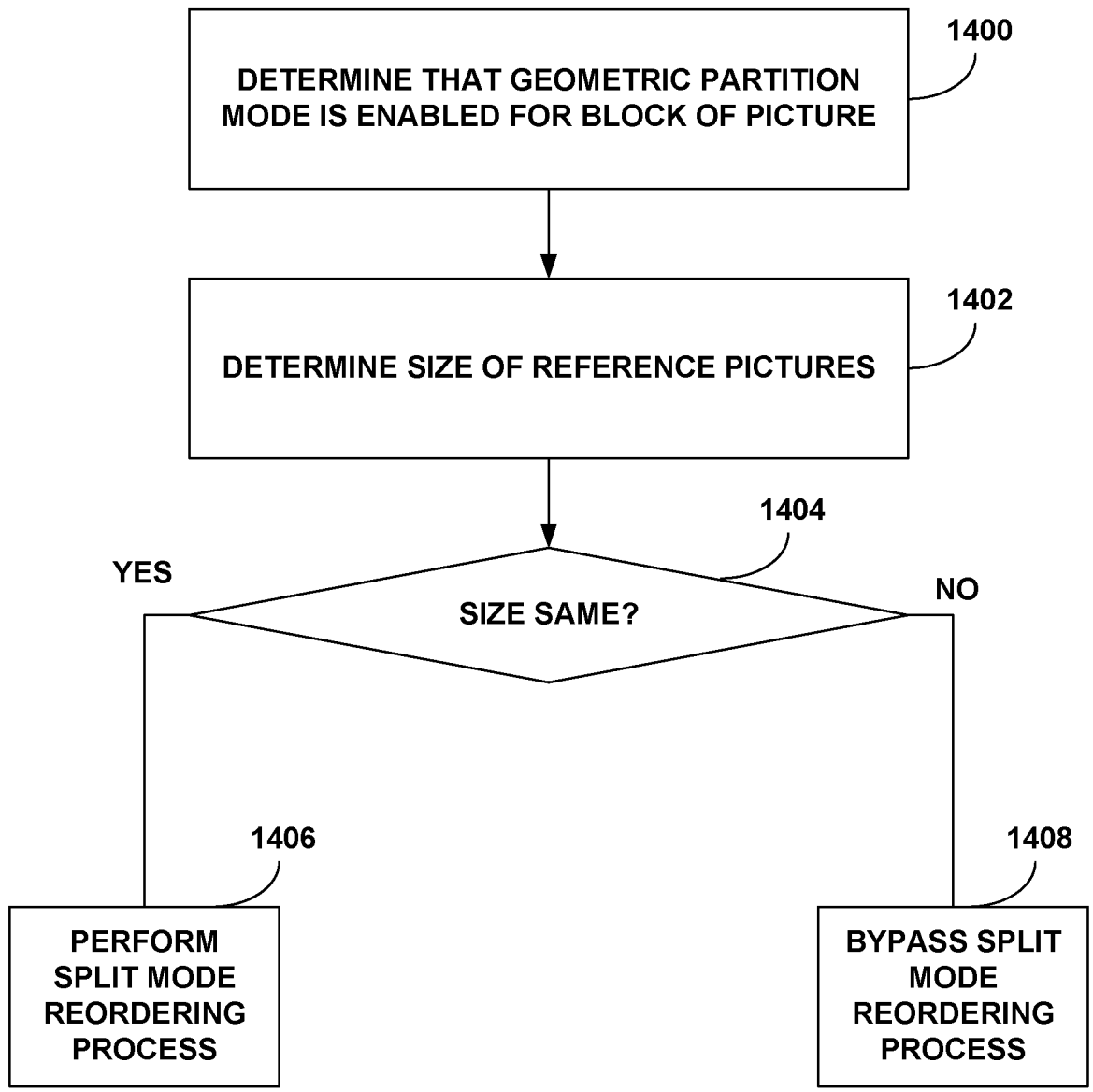
FIG. 14 is a flowchart illustrating an example method of decoding video data with reference picture resampling.

FIG. 14 is a flowchart illustrating an example method of decoding video data with reference picture resampling. In the example of FIG. 14, processing circuitry of video decoder 300 may determine that geometric partition mode is enabled for a block of a picture (1400). Examples of the geometric partition mode include GEO, GEO+MMVD and GEO+TM modes. The term GEO is used interchangeably with GPM (geometric partition mode).

The processing circuitry may determine size(s) of reference picture(s) for the block (1402). For instance, in geometric partition mode, there may be two partitions, and for each of the two partitions there may be a motion vector that points to a reference block in a reference picture. Accordingly, there may be two reference pictures, a first reference picture for the first partition of the two partitions, and a second reference picture for the second partition of the two partitions.

There may be a size associated with the first reference picture and the second reference picture. As one example, the size may refer to number of samples in the reference picture. The number of samples in the reference picture may include samples that have no luma or chroma values (e.g., blank or black samples). For instance, the size of the reference picture(s) may be based on reference picture resampling (RPR). The first reference picture and the second reference picture may be larger, smaller, or same size as the picture that includes the block being decoded.

The processing circuitry may determine whether size of the picture is the same as the size of the reference picture(s) (1404). If the size of the picture is the same as the size of the reference picture(s) (YES of 1404), the processing circuitry may perform a split mode reordering process (1406). Examples of the split mode reordering process include example techniques described in this disclosure in which video decoder 300 constructs a mapping list based on respective costs of respective split modes, as described in this disclosure such as example techniques to construct the mapping list described in FIG. 11 and FIG. 12.

If the size of the picture is not the same as the size of at least one reference picture (NO of 1404), the processing circuitry may bypass a split mode reordering process (1408). For example, rather than constructing a mapping list based on respective costs of respective split modes, the processing circuitry may utilize a default ordering of the split modes. That is, there may be no reordering of the index for the split modes, and the mapping list may be the default ordering. The default ordering may be a default order (e.g., from smaller splitting mode index to large one) for all candidates of GEO, GEO+MMVD and GEO+TM modes.

In this manner, there may be restrictions for reordering of split modes based on whether reference pictures have same or different sizes than the current picture (e.g., such as in reference picture resampling (RPR)). For instance, in accordance with the example of FIG. 14, the processing circuitry may determine that geometric partition mode is enabled for a first block of a first picture, and determine that a size of the reference picture(s) is same as a size of the first picture. In this example, the processing circuitry may perform a split mode reordering process (e.g., such as in the examples of FIGS. 11 and 12, and throughout this disclosure).

In accordance with the example of FIG. 14, the processing circuitry may determine that geometric partition mode is enabled for a second block of a second picture, and determine that a size of at least one reference picture is different than a size of the second picture (e.g., in RPR). In this example, the processing circuitry may bypass a split mode reordering process based on the determination that size of the at least one reference picture is different than the size of the second picture.

This disclosure describes example techniques that may be performed together or separately.

Clause 1. A method of decoding video data, the method comprising: accessing from memory a mapping table in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M; determining a split mode from the mapping table; and reconstructing a current block of the video data based on the determined split mode.

Clause 2. The method of clause 1, wherein the two or more GEO modes are grouped together based on the two or more GEO split modes having a same offset index and angles that are approximately perpendicular to each other.

Clause 3. The method of clause 1, wherein determining the split mode comprises: fixed-length decoding a group index value withing a range of 0 to M/(K−1); and determining the split mode based on the group index value.

Clause 4. The method of clause 1, wherein determining the split mode comprises: Golomb-Rice decoding a group index value with a divisor D, wherein the group index value is within a range of 0 to M/(K−1), and wherein D is within a range of 1 to M/K.

Clause 5. The method of any of clauses 1-4, wherein a group of the two or more GEO split modes includes K split modes, and wherein each of the K split modes in the group are assigned respective sub-mode index values.

Clause 6. The method of clause 5, wherein determining the split mode comprises: parsing a sub-mode index, which is encoded using fixed-length binary coding or Golomb-Rice coding, to identify one of the K split modes in the group; and determining the split mode based on the identified one of the K split modes.

Clause 7. The method of clause 5, wherein determining the split mode comprises: determining a sub-mode index value of a split mode of K split modes in the group based on a template matching TM cost to identify one of the K split modes in the group; and determining the split mode based on the identified one of the K split modes.

Clause 8. The method of clause 5, further comprising: ordering the K split modes in the group based on a template matching TM cost associated with respective ones of the K split modes in the group.

Clause 9. The method of any of clauses 1-8, wherein reconstructing the current block based on the determined split mode comprises: determining a first set of prediction values for a first partition of the current block defined by the determined split mode; determining a second set of prediction values for a second partition of the current block defined by the determined split mode; determining residual values for the current block; and reconstructing the current block based on the first set of prediction values, the second set of prediction values, and the residual values.

Clause 10. A method of encoding video data, the method comprising: accessing from memory a mapping table in which two or more geometric partition mode (GEO) split modes are grouped together to have the same index value in the mapping table, wherein a number of GEO split modes is equal to M, wherein a number of split modes in each group of the two or more GEO split modes is equal to K, and wherein K is less than M; determining a split mode from the mapping table; and signaling an index into the mapping table indicative of the split mode for decoding a current block of the video data.

Clause 11. The method of clause 10, wherein the two or more GEO modes are grouped together based on the two or more GEO split modes having a same offset index and angles that are approximately perpendicular to each other.

Clause 12. The method of clause 10, wherein signaling the index comprises: fixed-length encoding a group index value, that indicates a group, withing a range of 0 to M/(K−1).

Clause 13. The method of clause 10, wherein signaling the index comprises: Golomb-Rice encoding a group index value, that indicates a group, with a divisor D, wherein the group index value is within a range of 0 to M/(K−1), and wherein D is within a range of 1 to M/K.

Clause 14. The method of any of clauses 10-13, wherein a group of the two or more GEO split modes includes K split modes, and wherein each of the K split modes in the group are assigned respective sub-mode index values.

Clause 15. The method of clause 14, further comprising: signaling a sub-mode index, which is encoded using fixed-length binary coding or Golomb-Rice coding, to identify one of the K split modes in the group.

Clause 16. The method of clause 14, further comprising: determining a sub-mode index value of a split mode of K split modes in the group based on a template matching TM cost to identify one of the K split modes in the group.

Clause 17. The method of clause 14, further comprising: ordering the K split modes in the group based on a template matching TM cost associated with respective ones of the K split modes in the group.

Clause 18. A device for decoding video data, the device comprising: a memory; and processing circuitry coupled to the memory and configured to perform the method of any of clauses 1-9.

Clause 19. The device of clause 18, further comprising a display configured to display decoded video data.

Clause 20. The device of any of clauses 18 and 19, wherein the device comprises one or more of a camera, a computer, a mobile device, a broadcast receiver device, or a set-top box.

Clause 21. A computer-readable storage medium having stored thereon instructions that, when executed, cause one or more processors to perform the method of any of clauses 1-9.

Clause 22. A device for decoding video data, the device comprising means for performing the method of any of clauses 1-9.

Clause 23. A device for encoding video data, the device comprising: a memory; and processing circuitry configured to perform the method of any of clauses 10-17.

Clause 24. The device of clause 23, further comprising a camera configured to capture the video data.

Clause 25. A computer-readable storage medium having stored thereon instructions that, when executed, cause one or more processors to perform the method of any of clauses 10-17.

Clause 26. A device for encoding video data, the device comprising means for performing the method of any of clauses 10-17.

Clause 27. A method of decoding video data, the method comprising: determining a cost associated with one or more split modes of geometric partition mode (GEO), wherein there are M split modes of GEO; constructing a mapping table having index values indicative of the split modes based on a respective cost for the one or more split modes of GEO; determining a split mode based on the mapping table; and reconstructing a current block of the video data based on the determined split mode.

Clause 28. The method of clause 27, wherein the cost is a template matching (TM) cost.

Clause 29. The method of any of clauses 27 and 28, wherein constructing the mapping table comprises: ordering the one or more split modes in ascending order based on the respective cost.

Clause 30. The method of any of clauses 27 and 28, wherein constructing the mapping table comprises: including N split modes having the lowest cost.

Clause 31. The method of clause 30, wherein a value of N is based on a size of the current block.

Clause 32. The method of any of clauses 27-31, wherein reconstructing the current block based on the determined split mode comprises: determining a first set of prediction values for a first partition of the current block defined by the determined split mode; determining a second set of prediction values for a second partition of the current block defined by the determined split mode; determining residual values for the current block; and reconstructing the current block based on the first set of prediction values, the second set of prediction values, and the residual values.

Clause 33. A method of encoding video data, the method comprising: determining a cost associated with one or more split modes of geometric partition mode (GEO), wherein there are M split modes of GEO; constructing a mapping table having index values indicative of the split modes based on the respective cost for the one or more split modes of GEO; determining a split mode based on the mapping table; and signaling an index into the mapping table indicative of the split mode for decoding a current block of the video data.

Clause 34. The method of clause 33, wherein the cost is template matching (TM) cost.

Clause 35. The method of any of clauses 33 and 34, wherein constructing the mapping table comprises: ordering the one or more split modes in ascending order based on the respective cost.

Clause 36. The method of any of clauses 33 and 34, wherein constructing the mapping table comprises: including N split modes having the lowest cost.

Clause 37. The method of clause 36, wherein a value of N is based on a size of the current block.

Clause 38. A device for decoding video data, the device comprising: a memory; and processing circuitry coupled to the memory and configured to perform the method of any of clauses 27-32.

Clause 39. The device of clause 38, further comprising a display configured to display decoded video data.

Clause 40. The device of any of clauses 38 and 39, wherein the device comprises one or more of a camera, a computer, a mobile device, a broadcast receiver device, or a set-top box.

Clause 41. A computer-readable storage medium having stored thereon instructions that, when executed, cause one or more processors to perform the method of any of clauses 27-32.

Clause 42. A device for decoding video data, the device comprising means for performing the method of any of clauses 27-32.

Clause 43. A device for encoding video data, the device comprising: a memory; and processing circuitry configured to perform the method of any of clauses 33-37.

Clause 44. The device of clause 43, further comprising a camera configured to capture the video data.

Clause 45. A computer-readable storage medium having stored thereon instructions that, when executed, cause one or more processors to perform the method of any of clauses 33-37.

Clause 46. A device for encoding video data, the device comprising means for performing the method of any of clauses 33-37.

Clause 1A. A method of encoding or decoding video data, the method comprising: determining that geometric partition mode is enabled for a current block of the video data, the geometric partition mode comprising a plurality of split modes that each defines an edge for partitioning; for each split mode among at least two of the plurality of split modes, determining a respective cost associated with a respective split mode; constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determining a split mode amongst the plurality of split modes within the mapping list; and reconstructing a current block of the video data based on the split mode.

Clause 2A. The method of clause 1A, wherein determining the respective cost associated with the respective split mode comprises: determining a respective reference template based on the respective split mode; determining a current template for the current block, the current template comprising samples external to the current block; and determining the respective cost associated with the respective split mode based on the respective reference template and the current template.

Clause 3A. The method of clause 2A, wherein determining the respective reference template comprises: determining a first reference template based on a first reference block identified by a first motion vector of a first partition of the current block; determining a second reference template based on a second reference block identified by a second motion vector of a second partition of the current block; and combining samples from the first reference template and the second reference template based on the respective split mode to generate the respective reference template.

Clause 4A. The method of clause 3A, wherein the first reference template comprises a first portion of samples above the first reference block and a second portion of samples left of the first reference block, and wherein the second reference template comprises a first portion of samples above the second reference block and a second portion of samples left of the second reference block.

Clause 5A. The method of any of clauses 3A and 4A, wherein combining samples from the first reference template and the second reference template based on the respective split mode to generate the respective reference template comprises: applying the respective split mode to the first reference block; extending the applied respective split mode to samples of the first reference template to generate a first set of samples in the first reference template and a second set of samples in the first reference template; accessing the first set of samples in the first reference template based on the extension of the applied respective split mode to the samples of the first reference template; applying the respective split mode to the second reference block; extending the applied respective split mode to samples of the second reference template to generate a third set of samples in the second reference template and a fourth set of samples in the second reference template; accessing the third set of samples in the second reference template based on the extension of the applied respective split mode to the samples of the second reference template; and combining the first set of samples and the third set of samples to generate the respective reference template.

Clause 6A. The method of clause 5A, wherein combining the first set of samples and the third set of samples to generate the respective reference templates comprises: blending one or more samples in the first set of samples with one or more samples in the fourth set of samples; blending one or more samples in the third set of samples and one or more samples in the second set of samples; and combining the first set of samples and the third set of samples based on the blending.

Clause 7A. The method of any of clauses 1A-6A, further comprising: receiving an index value indicative of the split mode; and determining the split mode based on the index value into the mapping list.

Clause 8A. The method of clause 7A, wherein receiving the index value comprises at least one of: fixed-length binary decoding information indicative of the index value; truncated binary decoding information indicative of the index; Golomb-Rice decoding information indicative of the index value; or context-based adaptive coding (CABAC) decoding one or more bins of information indicative of the index value, including examples where some of the one or more bins are CABAC decoded, and others are bypass decoded and examples where all bins are CABAC decoded.

Clause 9A. The method of any of clauses 1A-8A, wherein constructing the mapping list comprises ordering one or more split modes of the plurality of split modes in ascending order of the index values based on the respective costs.

Clause 10A. The method of any of clauses 1A-9A, wherein constructing the mapping list comprises including N split modes of the plurality of split modes having the lowest costs.

Clause 11A. The method of any of clauses 1A-10A, wherein the current block is of a first picture, and the current block is a first block, the method further comprising: determining that geometric partition mode is enabled for a second block of a second picture of the video data; determining that a size of at least one reference picture for the second block is different than a size of the second picture; and bypassing a split mode reordering process based on the determination that the size of the at least one reference picture is different than the size of the second picture.

Clause 12A. The method of any of clauses 1A-11A, further comprising signaling an index value indicative of the split mode.

Clause 13A. A device for encoding or decoding video data, the device comprising: memory configured to store video data; and processing circuitry coupled to the memory and configured to: determine that geometric partition mode is enabled for a current block of the video data, the geometric partition mode comprising a plurality of split modes that each defines an edge for partitioning; for each split mode among at least two of the plurality of split modes, determine a respective cost associated with a respective split mode; construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determine a split mode amongst the plurality of split modes within the mapping list; and reconstruct a current block of the video data based on the split mode.

Clause 14A. The device of clause 13A, wherein to determine the respective cost associated with the respective split mode, the processing circuitry is configured to: determine a respective reference template based on the respective split mode; determine a current template for the current block, the current template comprising samples external to the current block; and determine the respective cost associated with the respective split mode based on the respective reference template and the current template.

Clause 15A. The device of clause 14A, wherein to determine the respective reference template, the processing circuitry is configured to: determine a first reference template based on a first reference block identified by a first motion vector of a first partition of the current block; determine a second reference template based on a second reference block identified by a second motion vector of a second partition of the current block; and combine samples from the first reference template and the second reference template based on the respective split mode to generate the respective reference template.

Clause 16A. The device of clause 15A, wherein the first reference template comprises a first portion of samples above the first reference block and a second portion of samples left of the first reference block, and wherein the second reference template comprises a first portion of samples above the second reference block and a second portion of samples left of the second reference block.

Clause 17A. The device of any of clauses 15A and 16A, wherein to combine samples from the first reference template and the second reference template based on the respective split mode to generate the respective reference template, the processing circuitry is configured to: apply the respective split mode to the first reference block; extend the applied respective split mode to samples of the first reference template to generate a first set of samples in the first reference template and a second set of samples in the first reference template; access the first set of samples in the first reference template based on the extension of the applied respective split mode to the samples of the first reference template; apply the respective split mode to the second reference block; extend the applied respective split mode to samples of the second reference template to generate a third set of samples in the second reference template and a fourth set of samples in the second reference template; access the third set of samples in the second reference template based on the extension of the applied respective split mode to the samples of the second reference template; and combine the first set of samples and the third set of samples to generate the respective reference template.

Clause 18A. The device of clause 17A, wherein to combine the first set of samples and the third set of samples to generate the respective reference templates, the processing circuitry is configured to: blend one or more samples in the first set of samples with one or more samples in the fourth set of samples; blend one or more samples in the third set of samples and one or more samples in the second set of samples; and combine the first set of samples and the third set of samples based on the blending.

Clause 19A. The device of any of clauses 13A-18A, wherein the processing circuitry is configured to: receive an index value indicative of the split mode; and determine the split mode based on the index value into the mapping list.

Clause 20A. The device of clause 19A, wherein to receive the index value, the processing circuitry is configured to at least one of: fixed-length binary decode information indicative of the index value; truncated binary decode information indicative of the index value; Golomb-Rice decode information indicative of the index value; or context-based adaptive coding (CABAC) decode one or more bins of information indicative of the index value.

Clause 21A. The device of any of clause 13A-20A, wherein to construct the mapping list, the processing circuitry is configured to order one or more split modes of the plurality of split modes in ascending order of the index values based on the respective costs.

Clause 22A. The device of any of clauses 13A-21A, wherein to construct the mapping list, the processing circuitry is configured to include N split modes of the plurality of split modes having the lowest costs.

Clause 23A. The device of any of clauses 13A-22A, wherein the current block is of a first picture, and the current block is a first block, and wherein the processing circuitry is configured to: determine that geometric partition mode is enabled for a second block of a second picture of the video data; determine that a size of at least one reference picture for the second block is different than a size of the second picture; and bypass a split mode reordering process based on the determination that the size of the at least one reference picture is different than the size of the second picture.

Clause 24A. The device of any of clauses 13A-23A, wherein the processing circuitry is configured to signal an index value indicative of the split mode.

Clause 25A. A computer-readable storage medium storing instructions thereon that when executed cause one or more processors for encoding or decoding video data to: determine that geometric partition mode is enabled for a current block of the video data, the geometric partition mode comprising a plurality of split modes that each defines an edge for partitioning; for each split mode among at least two of the plurality of split modes, determine a respective cost associated with a respective split mode; construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; determine a split mode amongst the plurality of split modes within the mapping list; and reconstruct a current block of the video data based on the split mode.

Clause 26A. The computer-readable storage medium of clause 25A, wherein the instructions that cause the one or more processors to determine the respective cost associated with the respective split mode comprise instructions that cause the one or more processors to: determine a respective reference template based on the respective split mode; determine a current template for the current block, the current template comprising samples external to the current block; and determine the respective cost associated with the respective split mode based on the respective reference template and the current template.

Clause 27A. The computer-readable storage medium of clause 26A, wherein the instructions that cause the one or more processors to determine the respective reference template comprise instructions that cause the one or more processors to: determine a first reference template based on a first reference block identified by a first motion vector of a first partition of the current block; determine a second reference template based on a second reference block identified by a second motion vector of a second partition of the current block; and combine samples from the first reference template and the second reference template based on the respective split mode to generate the respective reference template.

Clause 28A. The computer-readable storage medium of clause 27A, wherein the first reference template comprises a first portion of samples above the first reference block and a second portion of samples left of the first reference block, and wherein the second reference template comprises a first portion of samples above the second reference block and a second portion of samples left of the second reference block.

Clause 29. The computer-readable storage medium of any of clauses 27A and 28A, wherein the instructions that cause the one or more processors to combine samples from the first reference template and the second reference template based on the respective split mode to generate the respective reference template comprise instructions that cause the one or more processors to: apply the respective split mode to the first reference block; extend the applied respective split mode to samples of the first reference template to generate a first set of samples in the first reference template and a second set of samples in the first reference template; access the first set of samples in the first reference template based on the extension of the applied respective split mode to the samples of the first reference template; apply the respective split mode to the second reference block; extend the applied respective split mode to samples of the second reference template to generate a third set of samples in the second reference template and a fourth set of samples in the second reference template; access the third set of samples in the second reference template based on the extension of the applied respective split mode to the samples of the second reference template; and combine the first set of samples and the third set of samples to generate the respective reference template.

Clause 30A. The computer-readable storage medium of clause 29A, wherein the instructions that cause the one or more processors to combine the first set of samples and the third set of samples to generate the respective reference templates comprise instructions that cause the one or more processors to: blend one or more samples in the first set of samples with one or more samples in the fourth set of samples; blend one or more samples in the third set of samples and one or more samples in the second set of samples; and combine the first set of samples and the third set of samples based on the blending.

Clause 31A. The computer-readable storage medium of any of clauses 25A-30A, wherein the instructions further comprise instructions that cause the one or more processors to: receive an index value indicative of the split mode; and determine the split mode based on the index value into the mapping list.

Clause 32A. The computer-readable storage medium of any of clauses 25A-31A, wherein the instructions that cause the one or more processors to receive the index value comprise instructions that cause the one or more processors to at least one of: fixed-length binary decode information indicative of the index value; truncated binary decode information indicative of the index value; Golomb-Rice decode information indicative of the index value; or context-based adaptive coding (CABAC) decode one or more bins of information indicative of the index value.

Clause 33A. The computer-readable storage medium of any of clauses 25A-32A, wherein the instructions that cause the one or more processors to construct the mapping list comprise instructions that cause the one or more processors to order one or more split modes of the plurality of split modes in ascending order of the index values based on the respective costs.

Clause 34A. The computer-readable storage medium of any of clauses 25A-33A, wherein the instructions that cause the one or more processors to construct the mapping list comprise instructions that cause the one or more processors to include N split modes of the plurality of split modes having the lowest costs.

Clause 35A. The computer-readable storage medium of any of clauses 25A-34A, wherein the current block is of a first picture, and the current block is a first block, and wherein the instructions further comprise instructions that cause the one or more processors to: determine that geometric partition mode is enabled for a second block of a second picture of the video data; determine that a size of at least one reference picture for the second block is different than a size of the second picture; and bypass a split mode reordering process based on the determination that the size of the at least one reference picture is different than the size of the second picture.

Clause 36A. The computer-readable storage medium of any of clauses 25A-35A, wherein the instructions further comprise instructions that cause the one or more processors to signal an index value indicative of the split mode.

Clause 37A. A device for encoding or decoding video data, the device comprising: means for determining that geometric partition mode is enabled for a current block of the video data, the geometric partition mode comprising a plurality of split modes that each defines an edge for partitioning; for each split mode among at least two of the plurality of split modes, means for determining a respective cost associated with a respective split mode; means for constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list; means for determining a split mode amongst the plurality of split modes within the mapping list; and means for reconstructing a current block of the video data based on the split mode.

Clause 38A. The device of clause 37A, wherein the means for determining the respective cost associated with the respective split mode comprises: means for determining a respective reference template based on the respective split mode; means for determining a current template for the current block, the current template comprising samples external to the current block; and means for determining the respective cost associated with the respective split mode based on the respective reference template and the current template.

Clause 39A. The device of clause 38A, wherein the means for determining the respective reference template comprises: means for determining a first reference template based on a first reference block identified by a first motion vector of a first partition of the current block; means for determining a second reference template based on a second reference block identified by a second motion vector of a second partition of the current block; and means for combining samples from the first reference template and the second reference template based on the respective split mode to generate the respective reference template.

Clause 40A. The device of clause 39A, wherein the first reference template comprises a first portion of samples above the first reference block and a second portion of samples left of the first reference block, and wherein the second reference template comprises a first portion of samples above the second reference block and a second portion of samples left of the second reference block.

Clause 41A. The device of any of clauses 39A and 40A, wherein the means for combining samples from the first reference template and the second reference template based on the respective split mode to generate the respective reference template comprises: means for applying the respective split mode to the first reference block; means for extending the applied respective split mode to samples of the first reference template to generate a first set of samples in the first reference template and a second set of samples in the first reference template; means for accessing the first set of samples in the first reference template based on the extension of the applied respective split mode to the samples of the first reference template; means for applying the respective split mode to the second reference block; means for extending the applied respective split mode to samples of the second reference template to generate a third set of samples in the second reference template and a fourth set of samples in the second reference template; means for accessing the third set of samples in the second reference template based on the extension of the applied respective split mode to the samples of the second reference template; and means for combining the first set of samples and the third set of samples to generate the respective reference template.

Clause 42A. The device of clause 41A, wherein the means for combining the first set of samples and the third set of samples to generate the respective reference templates comprises: means for blending one or more samples in the first set of samples with one or more samples in the fourth set of samples; means for blending one or more samples in the third set of samples and one or more samples in the second set of samples; and means for combining the first set of samples and the third set of samples based on the blending.

Clause 43A. The device of any of clauses 37A-42A, further comprising: means for receiving an index value indicative of the split mode; and means for determining the split mode based on the index value into the mapping list.

Clause 44A. The device of clause 43A, wherein the means for receiving the index value comprises at least one of: means for fixed-length binary decoding information indicative of the index value; means for truncated binary decoding information indicative of the index value; means for Golomb-Rice decoding information indicative of the index value; or means for context-based adaptive coding (CABAC) decoding one or more bins of information indicative of the index value.

Clause 45A. The device of any of clauses 37A-44A, wherein the means for constructing the mapping list comprises means for ordering one or more split modes of the plurality of split modes in ascending order of the index values based on the respective costs.

Clause 46A. The device of any of clauses 37A-45A, wherein the means for constructing the mapping list comprises means for including N split modes of the plurality of split modes having the lowest costs.

Clause 47A. The device of any of clauses 37A-46A, wherein the current block is of a first picture, and the current block is a first block, the device further comprising: means for determining that geometric partition mode is enabled for a second block of a second picture of the video data; means for determining that a size of at least one reference picture for the second block is different than a size of the second picture; and means for bypassing a split mode reordering process based on the determination that the size of the at least one reference picture is different than the size of the second picture.

Clause 48A. The device of any of clauses 37A-47A, further comprising means for signaling an index value indicative of the split mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   determining that geometric partition mode is enabled for a current block of the video data, the geometric partition mode comprising a plurality of split modes that each defines a respective edge for partitioning;
   for each split mode, among at least two split modes of the plurality of split modes, determining a respective cost associated with a respective split mode, the respective cost indicative of a likelihood of use of the respective split mode;
   constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list;
   determining a split mode amongst the plurality of split modes within the mapping list; and
   reconstructing a current block of the video data based on the split mode.

2. The method of claim 1, wherein determining the respective cost associated with the respective split mode comprises:
   determining a respective reference template based on the respective split mode;
   determining a current template for the current block, the current template comprising samples external to the current block; and
   determining the respective cost associated with the respective split mode based on the respective reference template and the current template.

3. The method of claim 2, wherein determining the respective reference template comprises:
   determining a first reference template based on a first reference block identified by a first motion vector of a first partition of the current block;
   determining a second reference template based on a second reference block identified by a second motion vector of a second partition of the current block; and
   combining samples from the first reference template and the second reference template based on the respective split mode to generate the respective reference template.

4. The method of claim 3, wherein the first reference template comprises a first portion of samples above the first reference block and a second portion of samples left of the first reference block, and wherein the second reference template comprises a first portion of samples above the second reference block and a second portion of samples left of the second reference block.

5. The method of claim 3, wherein combining samples from the first reference template and the second reference template based on the respective split mode to generate the respective reference template comprises:
   applying the respective split mode to the first reference block;
   extending the applied respective split mode to samples of the first reference template to generate a first set of samples in the first reference template and a second set of samples in the first reference template;
   accessing the first set of samples in the first reference template based on the extension of the applied respective split mode to the samples of the first reference template;
   applying the respective split mode to the second reference block;
   extending the applied respective split mode to samples of the second reference template to generate a third set of samples in the second reference template and a fourth set of samples in the second reference template;
   accessing the third set of samples in the second reference template based on the extension of the applied respective split mode to the samples of the second reference template; and
   combining the first set of samples and the third set of samples to generate the respective reference template.

6. The method of claim 5, wherein combining the first set of samples and the third set of samples to generate the respective reference templates comprises:
   blending one or more samples in the first set of samples with one or more samples in the fourth set of samples;
   blending one or more samples in the third set of samples and one or more samples in the second set of samples; and
   combining the first set of samples and the third set of samples based on the blending.

7. The method of claim 1, further comprising:
   receiving an index value indicative of the split mode; and
   determining the split mode based on the index value into the mapping list.

8. The method of claim 7, wherein receiving the index value comprises at least one of:
   fixed-length binary decoding information indicative of the index value;
   truncated binary decoding information indicative of the index value;
   Golomb-Rice decoding information indicative of the index value; or
   context-based adaptive coding (CABAC) decoding one or more bins of information indicative of the index value.

9. The method of claim 1, wherein constructing the mapping list comprises ordering one or more split modes of the plurality of split modes in ascending order of the index values based on the respective costs.

10. The method of claim 1, wherein constructing the mapping list comprises including N split modes of the plurality of split modes having the lowest costs.

11. The method of claim 1, wherein the current block is of a first picture, and the current block is a first block, the method further comprising:
   determining that geometric partition mode is enabled for a second block of a second picture of the video data;
   determining that a size of at least one reference picture for the second block is different than a size of the second picture; and bypassing a split mode reordering process based on the determination that the size of the at least one reference picture is different than the size of the second picture.

12. The method of claim 1, further comprising signaling an index value indicative of the split mode.

13. A device for encoding or decoding video data, the device comprising:
   memory configured to store video data; and
   processing circuitry coupled to the memory and configured to:
      determine that geometric partition mode is enabled for a current block of the video data, the geometric partition mode comprising a plurality of split modes that each defines a respective edge for partitioning;
      for each split mode, among at least two split modes of the plurality of split modes, determine a respective cost associated with a respective split mode, the respective cost indicative of a likelihood of use of the respective split mode;
      construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list;
      determine a split mode amongst the plurality of split modes within the mapping list; and
      reconstruct a current block of the video data based on the split mode.

14. The device of claim 13, wherein to determine the respective cost associated with the respective split mode, the processing circuitry is configured to:
   determine a respective reference template based on the respective split mode;
   determine a current template for the current block, the current template comprising samples external to the current block; and
   determine the respective cost associated with the respective split mode based on the respective reference template and the current template.

15. The device of claim 14, wherein to determine the respective reference template, the processing circuitry is configured to:
   determine a first reference template based on a first reference block identified by a first motion vector of a first partition of the current block;
   determine a second reference template based on a second reference block identified by a second motion vector of a second partition of the current block; and
   combine samples from the first reference template and the second reference template based on the respective split mode to generate the respective reference template.

16. The device of claim 15, wherein the first reference template comprises a first portion of samples above the first reference block and a second portion of samples left of the first reference block, and wherein the second reference template comprises a first portion of samples above the second reference block and a second portion of samples left of the second reference block.

17. The device of claim 15, wherein to combine samples from the first reference template and the second reference template based on the respective split mode to generate the respective reference template, the processing circuitry is configured to:
   apply the respective split mode to the first reference block;
   extend the applied respective split mode to samples of the first reference template to generate a first set of samples in the first reference template and a second set of samples in the first reference template;
   access the first set of samples in the first reference template based on the extension of the applied respective split mode to the samples of the first reference template;
   apply the respective split mode to the second reference block;
   extend the applied respective split mode to samples of the second reference template to generate a third set of samples in the second reference template and a fourth set of samples in the second reference template;
   access the third set of samples in the second reference template based on the extension of the applied respective split mode to the samples of the second reference template; and
   combine the first set of samples and the third set of samples to generate the respective reference template.

18. The device of claim 17, wherein to combine the first set of samples and the third set of samples to generate the respective reference templates, the processing circuitry is configured to:
   blend one or more samples in the first set of samples with one or more samples in the fourth set of samples;
   blend one or more samples in the third set of samples and one or more samples in the second set of samples; and
   combine the first set of samples and the third set of samples based on the blending.

19. The device of claim 13, wherein the processing circuitry is configured to:
   receive an index value indicative of the split mode; and
   determine the split mode based on the index value into the mapping list.

20. The device of claim 19, wherein to receive the index value, the processing circuitry is configured to at least one of:
   fixed-length binary decode information indicative of the index value;
   truncated binary decode information indicative of the index value;
   Golomb-Rice decode information indicative of the index value; or
   context-based adaptive coding (CABAC) decode one or more bins of information indicative of the index value.

21. The device of claim 13, wherein to construct the mapping list, the processing circuitry is configured to order one or more split modes of the plurality of split modes in ascending order of the index values based on the respective costs.

22. The device of claim 13, wherein to construct the mapping list, the processing circuitry is configured to include N split modes of the plurality of split modes having the lowest costs.

23. The device of claim 13, wherein the current block is of a first picture, and the current block is a first block, and wherein the processing circuitry is configured to:
   determine that geometric partition mode is enabled for a second block of a second picture of the video data;
   determine that a size of at least one reference picture for the second block is different than a size of the second picture; and bypass a split mode reordering process based on the determination that the size of the at least one reference picture is different than the size of the second picture.

24. The device of claim 13, wherein the processing circuitry is configured to signal an index value indicative of the split mode.

25. A non-transitory computer-readable storage medium storing instructions thereon that when executed cause one or more processors for encoding or decoding video data to:
   determine that geometric partition mode is enabled for a current block of the video data, the geometric partition mode comprising a plurality of split modes that each defines a respective edge for partitioning;
   for each split mode, among at least two split modes of the plurality of split modes, determine a respective cost associated with a respective split mode, the respective cost indicative of a likelihood of use of the respective split mode;
   construct, based on the respective costs associated with the respective split modes, a mapping list including index values respectively associated with values indicative of the respective split modes, where a lower index value in the mapping list is associated with a first split mode having a lower cost than a second split mode with a higher index value in the mapping list;
   determine a split mode amongst the plurality of split modes within the mapping list; and
   reconstruct a current block of the video data based on the split mode.

26. The non-transitory computer-readable storage medium of claim 25, wherein the instructions that cause the one or more processors to determine the respective cost associated with the respective split mode comprise instructions that cause the one or more processors to:
   determine a respective reference template based on the respective split mode;
   determine a current template for the current block, the current template comprising samples external to the current block; and
   determine the respective cost associated with the respective split mode based on the respective reference template and the current template.

27. The non-transitory computer-readable storage medium of claim 26, wherein the instructions that cause the one or more processors to determine the respective reference template comprise instructions that cause the one or more processors to:
   determine a first reference template based on a first reference block identified by a first motion vector of a first partition of the current block;
   determine a second reference template based on a second reference block identified by a second motion vector of a second partition of the current block; and
   combine samples from the first reference template and the second reference template based on the respective split mode to generate the respective reference template.

28. The non-transitory computer-readable storage medium of claim 27, wherein the first reference template comprises a first portion of samples above the first reference block and a second portion of samples left of the first reference block, and wherein the second reference template comprises a first portion of samples above the second reference block and a second portion of samples left of the second reference block.

29. The non-transitory computer-readable storage medium of claim 27, wherein the instructions that cause the one or more processors to combine samples from the first reference template and the second reference template based on the respective split mode to generate the respective reference template comprise instructions that cause the one or more processors to:
   apply the respective split mode to the first reference block;
   extend the applied respective split mode to samples of the first reference template to generate a first set of samples in the first reference template and a second set of samples in the first reference template;
   access the first set of samples in the first reference template based on the extension of the applied respective split mode to the samples of the first reference template;
   apply the respective split mode to the second reference block;
   extend the applied respective split mode to samples of the second reference template to generate a third set of samples in the second reference template and a fourth set of samples in the second reference template;
   access the third set of samples in the second reference template based on the extension of the applied respective split mode to the samples of the second reference template; and
   combine the first set of samples and the third set of samples to generate the respective reference template.

30. The non-transitory computer-readable storage medium of claim 29, wherein the instructions that cause the one or more processors to combine the first set of samples and the third set of samples to generate the respective reference templates comprise instructions that cause the one or more processors to:
   blend one or more samples in the first set of samples with one or more samples in the fourth set of samples;
   blend one or more samples in the third set of samples and one or more samples in the second set of samples; and
   combine the first set of samples and the third set of samples based on the blending.

31. The non-transitory computer-readable storage medium of claim 25, wherein the instructions further comprise instructions that cause the one or more processors to:
   receive an index value indicative of the split mode; and
   determine the split mode based on the index value into the mapping list.

32. The non-transitory computer-readable storage medium of claim 25, wherein the instructions that cause the one or more processors to receive the index value comprise instructions that cause the one or more processors to at least one of:
   fixed-length binary decode information indicative of the index value;
   truncated binary decode information indicative of the index value;
   Golomb-Rice decode information indicative of the index value; or
   context-based adaptive coding (CABAC) decode one or more bins of information indicative of the index value.

33. The non-transitory computer-readable storage medium of claim 25, wherein the instructions that cause the one or more processors to construct the mapping list comprise instructions that cause the one or more processors to order one or more split modes of the plurality of split modes in ascending order of the index values based on the respective costs.

34. The non-transitory computer-readable storage medium of claim 25, wherein the instructions that cause the one or more processors to construct the mapping list comprise instructions that cause the one or more processors to include N split modes of the plurality of split modes having the lowest costs.

35. The non-transitory computer-readable storage medium of claim 25, wherein the current block is of a first picture, and the current block is a first block, and wherein the instructions further comprise instructions that cause the one or more processors to:
determine that geometric partition mode is enabled for a second block of a second picture of the video data;
determine that a size of at least one reference picture for the second block is different than a size of the second picture; and
bypass a split mode reordering process based on the determination that the size of the at least one reference picture is different than the size of the second picture.

36. The non-transitory computer-readable storage medium of claim 25, wherein the instructions further comprise instructions that cause the one or more processors to signal an index value indicative of the split mode.

37. A device for encoding or decoding video data, the device comprising:
means for determining that geometric partition mode is enabled for a current block of the video data, the geometric partition mode comprising a plurality of split modes that each defines a respective edge for partitioning;
for each split mode, among at least two split modes of the plurality of split modes, means for determining a respective cost associated with a respective split mode, the respective cost indicative of a likelihood of use of the respective split mode;
means for constructing, based on the respective costs associated with the respective split modes, a mapping list including index values respectively associated with values indicative of the respective split modes, where a lower index value in the mapping list is associated with a first split mode having a lower cost than a second split mode with a higher index value in the mapping list;
means for determining a split mode amongst the plurality of split modes within the mapping list; and
means for reconstructing a current block of the video data based on the split mode.

38. The device of claim 37, wherein the means for determining the respective cost associated with the respective split mode comprises:
means for determining a respective reference template based on the respective split mode;
means for determining a current template for the current block, the current template comprising samples external to the current block; and
means for determining the respective cost associated with the respective split mode based on the respective reference template and the current template.

39. The device of claim 38, wherein the means for determining the respective reference template comprises:
means for determining a first reference template based on a first reference block identified by a first motion vector of a first partition of the current block;
means for determining a second reference template based on a second reference block identified by a second motion vector of a second partition of the current block; and
means for combining samples from the first reference template and the second reference template based on the respective split mode to generate the respective reference template.

40. The device of claim 39, wherein the first reference template comprises a first portion of samples above the first reference block and a second portion of samples left of the first reference block, and wherein the second reference template comprises a first portion of samples above the second reference block and a second portion of samples left of the second reference block.

41. The device of claim 39, wherein the means for combining samples from the first reference template and the second reference template based on the respective split mode to generate the respective reference template comprises:
means for applying the respective split mode to the first reference block;
means for extending the applied respective split mode to samples of the first reference template to generate a first set of samples in the first reference template and a second set of samples in the first reference template;
means for accessing the first set of samples in the first reference template based on the extension of the applied respective split mode to the samples of the first reference template;
means for applying the respective split mode to the second reference block;
means for extending the applied respective split mode to samples of the second reference template to generate a third set of samples in the second reference template and a fourth set of samples in the second reference template;
means for accessing the third set of samples in the second reference template based on the extension of the applied respective split mode to the samples of the second reference template; and
means for combining the first set of samples and the third set of samples to generate the respective reference template.

42. The device of claim 41, wherein the means for combining the first set of samples and the third set of samples to generate the respective reference templates comprises:
means for blending one or more samples in the first set of samples with one or more samples in the fourth set of samples;
means for blending one or more samples in the third set of samples and one or more samples in the second set of samples; and
means for combining the first set of samples and the third set of samples based on the blending.

43. The device of claim 37, further comprising:
means for receiving an index value indicative of the split mode; and
means for determining the split mode based on the index value into the mapping list.

44. The device of claim 43, wherein the means for receiving the index value comprises at least one of:
means for fixed-length binary decoding information indicative of the index value;
means for truncated binary decoding information indicative of the index value;
means for Golomb-Rice decoding information indicative of the index value; or
means for context-based adaptive coding (CABAC) decoding one or more bins of information indicative of the index value.

45. The device of claim 37, wherein the means for constructing the mapping list comprises means for ordering one or more split modes of the plurality of split modes in ascending order of the index values based on the respective costs.

46. The device of claim 37, wherein the means for constructing the mapping list comprises means for including N split modes of the plurality of split modes having the lowest costs.

47. The device of claim 37, wherein the current block is of a first picture, and the current block is a first block, the device further comprising:
- means for determining that geometric partition mode is enabled for a second block of a second picture of the video data;
- means for determining that a size of at least one reference picture for the second block is different than a size of the second picture; and
- means for bypassing a split mode reordering process based on the determination that the size of the at least one reference picture is different than the size of the second picture.

48. The device of claim 37, further comprising means for signaling an index value indicative of the split mode.

* * * * *